United States Patent
Iyoda et al.

(10) Patent No.: US 7,159,922 B2
(45) Date of Patent: Jan. 9, 2007

(54) SEAT STRUCTURE FOR VEHICLE

(75) Inventors: Hirochika Iyoda, Hiroshima (JP); Shinya Matsumoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 224 days.

(21) Appl. No.: 10/934,516

(22) Filed: Sep. 7, 2004

(65) Prior Publication Data
US 2005/0067873 A1    Mar. 31, 2005

(30) Foreign Application Priority Data

Sep. 25, 2003  (JP) ............................. 2003-333833
Sep. 30, 2003  (JP) ............................. 2003-341126

(51) Int. Cl.
*B60N 2/02* (2006.01)

(52) U.S. Cl. ......................................... 296/66

(58) Field of Classification Search ................. 296/63, 296/64, 65.01, 65.02, 65.05, 65.09, 65.16, 296/66, 69; 297/353, 354.1, 378.1, 378.14
See application file for complete search history.

(56) References Cited

U.S. PATENT DOCUMENTS

| | | | | |
|---|---|---|---|---|
| 2,152,505 A | * | 3/1939 | Stuart et al. .............. 296/65.09 |
| 3,334,941 A | * | 8/1967 | Krasinski et al. ............. 296/66 |
| 3,703,310 A | * | 11/1972 | Lystad ......................... 296/10 |
| 4,106,809 A | * | 8/1978 | Minka ......................... 296/69 |
| 5,702,145 A | * | 12/1997 | Fowler et al. ................ 296/66 |
| 5,795,023 A | * | 8/1998 | Kayumi ...................... 297/331 |
| 5,840,416 A | * | 11/1998 | Repo .......................... 428/323 |
| 5,868,450 A | * | 2/1999 | Hashimoto ............... 296/65.09 |
| 5,967,584 A | * | 10/1999 | McCarthy et al. ........ 296/37.16 |
| 6,582,003 B1 | * | 6/2003 | Fourrey et al. ............... 296/64 |
| 6,598,926 B1 | * | 7/2003 | Price et al. .............. 296/65.09 |
| 6,676,216 B1 | * | 1/2004 | Freijy et al. ................ 297/335 |
| 6,702,355 B1 | * | 3/2004 | Price et al. .............. 296/37.16 |
| 2003/0098592 A1 | * | 5/2003 | Nygren et al. ........... 296/65.09 |

FOREIGN PATENT DOCUMENTS

| JP | 09-142189 | 6/1997 |
|---|---|---|
| JP | 11-115587 | 4/1999 |
| JP | 2000-272394 | 3/2000 |
| JP | 2000-108744 | 4/2000 |

* cited by examiner

*Primary Examiner*—H Gutman
(74) *Attorney, Agent, or Firm*—Nixon Peabody, LLP; Donald R. Studebaker

(57) ABSTRACT

There is provide a cover member which is pivotally connected to a vehicle floor near a rear end of a seat cushion at its lower end and to a seat back at its upper end. The seat back is supported by the cover member so as to move forward and be located in its rising position in front of the seat cushion and behind a front seat located before the rear seat according to a forward rotation of the cover member via the lower end pivotal connection to the vehicle floor. The cover member covers substantially an upper face of the seat cushion and provide a substantially flat and horizontal face at the vehicle rear in cooperation with a floor of the load compartment when the seat back has moved forward.

13 Claims, 21 Drawing Sheets

(a)

(b)

SEAT STRUCTURE FOR VEHICLE

BACKGROUND OF THE INVENTION

The present invention relates to a seat structure for a vehicle, and more particularly, to a movement mechanism of a rear seat which is disposed in front of a load compartment at a vehicle rear.

In recent years, various structures for a vehicle for effectively utilizing a limited space in the vehicle has been adopted. A structure in which a seat including a seat cushion and a seat back is configured so as to be partially foldable or moveable to provide a wide, flat and horizontal face for a load and the like is known.

For example, Japanese Patent Laid-Open Publication No. 11-115587 discloses a structure in which a seat back is moved forward in front of a seat cushion by a link member and thereby a substantially flat and horizontal face is constituted by a rest-side face of the seat back and a sitting face of the seat cushion. Also, Japanese Patent Laid-Open Publication No. 2000-272394 discloses a structure in which the seat cushion is rotated forward around an axis at the front end thereof and the seat back is pulled down forward, thereby forming a substantially flat face comprised of a bottom face of the seat cushion and a back face of the seat back. Further, Japanese Patent Laid-Open Publication No. 9-142189 discloses a structure in which the seat back is folded down on the sitting face of the seat cushion and then the seat cushion and the seat back are rotated forward together around an axis at the front of the seat cushion, thereby providing a flat face constituted by the bottom face of the seat cushion and a vehicle floor face on which the seat cushion is placed in a normal use state (namely, in a state of passenger sitting). Furthermore, Japanese Patent Laid-Open Publication No. 2000-108744 discloses a structure in which the seat back is folded down on the sitting face of the seat cushion and then the seat cushion and seat back are moved forward in parallel by a link member, thereby providing a flat face constituted by the back face of the seat back and the vehicle floor face on which the seat cushion is placed in the normal use state.

Herein, the following structures of holding or moving the seat would be preferable, namely, (a) the seat cushion should be fixed without being moved in order to secure a sufficient rigidity of the seat cushion for passengers sitting on or loads placed on the seat; (b) it should be easy to operate the seat to be folded or shifted; and (c) a dead space in the vehicle should be utilized effectively. Meanwhile, it may be useful to apply such structures of folding or moving the seat, in order to provide a horizontal face on which the loads and the like are placed, to a rear seat which is disposed in front of a vehicle load compartment for the purpose of obtaining a large load space at a vehicle rear. Herein, it would be preferable to locate a horizontal face of the seat and the floor face of the load compartment in lower positions in order to allow easy loading or unloading through a vehicle tail gate and provide a larger load compartment in a vehicle-height direction as well. Also, it would be preferable to constitute a substantially flat large face by the horizontal face of the seat and the floor face of the load compartment for the purpose of providing a stable loading space for relatively long loads and the like. However, the above-described prior art could not satisfy all these needs.

SUMMARY OF THE INVENTION

The present invention has been devised in view of the above problem, and an object of the present invention is to provide a seat structure for a vehicle which can move the rear seat by effectively utilizing the dead space in the vehicle without moving the seat cushion, and thereby form a substantially flat face comprised of the horizontal face of the seat and the floor face of the load compartment which are located in lower positions so as to allow easy loading or unloading and provide a larger space load compartment in the vehicle-height direction as well.

Further, another object of the present invention is to provide the seat structure for a vehicle in which the seat moving can be operated easily.

According to the present invention, there is provided a seat structure for a vehicle including a rear seat which is disposed in front of a load compartment at a vehicle rear, comprising a seat cushion, a seat back, a cover member to be disposed at a back side of the seat back, wherein the seat cushion and the seat back are configured so as to be separate from each other, and the cover member is pivotally connected to a vehicle floor at the vicinity of a rear end of the seat cushion at a lower end thereof and to the seat back at an upper end thereof, around respective axes extending in a vehicle width direction, whereby the seat back can be supported by the cover member so as to move forward and be located in a rising position thereof in front of the seat cushion and behind a front seat located before the rear seat according to a forward rotation of the cover member via the lower end pivotal connection to the vehicle floor, and the cover member is configured so as to cover substantially an upper face of the seat cushion and provide a substantially flat and horizontal face at the vehicle rear in cooperation with a floor of the load compartment when the seat back has moved forward.

Accordingly, since the seat back moves forward in front of the seat cushion and the cover member covers over the seat cushion by moving the seat back and rotating the cover member forward, the horizontal face is formed by the cover member in a low position without moving the seat cushion. Also, since the horizontal face forms the substantially flat face in cooperation with the floor of the load compartment, a large load compartment which can place long loads and the like stably therein can be obtained. Further, the seat back can be stored properly by effectively utilizing a dead space in front of the seat cushion.

Also, according to a preferred embodiment, the seat structure further comprises a guide member which is provided at a side face of the seat back so as to extend in a longitudinal direction of the seat back, and the upper end of the cover member to be pivotally connected to the seat back is configured so as to slide along the guide member with respect to the seat back.

Accordingly, since the upper end of the cover member slides along the guide member, the seat back which have moved forward can be properly located in its rising position in front of the seat cushion and along a back face of the front seat located before the rear seat, regardless of the height of the vehicle floor before the seat cushion.

Further, according to another preferred embodiment, the seat back comprises a cushion member and a holding member to be provided so as to hold the cushion member and include the guide member, and the cover member includes a support frame to support the seat back so as to hold a passenger sitting.

Accordingly, since the support frame to support the seat back so as to hold the passenger is provided at the cover member and the seat back includes the cushion member and the holding member including the guide member, the seat back can be formed lightly and thereby the operation of moving the seat back can be facilitated.

Also, according to another preferred embodiment, the seat structure further comprises a support member which is pivotally connected to the vehicle floor at one end thereof and to the seat back at other end thereof so as to support the seat back along with the cover member.

Accordingly, the seat back can be held stably in its use position, where the passenger sits, and its rising position, where it has been moved forward.

Also, according to another preferred embodiment, the seat structure further comprises a link member which is pivotally connected to the seat back or the support member at one end thereof and to the cover member at other end thereof, whereby the seat back is configured so as to be held in the rising position thereof by said link member interconnecting the seat back or the support member and the cover member.

Accordingly, the position of the seat back can be controlled properly with respect to the cover member while being moved, and thereby it can be moved properly between its use position and its rising position, holding the seat back stably to keep its rising position. Also, the seat back can be moved smoothly without any contact or interference with another seat.

Also, according to another preferred embodiment, the seat structure further comprises a biasing member to be interposed between the seat back and the cover member so as to resiliently bias away each other, and a fixing member to releasably fix the seat back to a sitting position for the passenger, whereby when the fixing member is released, the seat back can be rotated by the biasing member around the pivotal axis at the upper end of the cover member and supported by the cover member and the biasing member so as to move forward and be located in the rising position thereof.

Accordingly, the biasing member can provide the seat back with a substantially automatic forward movement when the fixing member is released, and thereby the cover member covers over a sitting face of the seat cushion to provide the horizontal face.

Also, according to another preferred embodiment, the biasing member is configured of an expanding member which is pivotally connected to a back face of the seat back at an upper end thereof and to the vehicle floor near the rear end of the seat cushion at a lower end thereof, around respective axes extending in the vehicle width direction, and biases the seat back forward and upward.

Accordingly, since the seat back and the vehicle floor are connected by the expanding member, the seat back is held by both the cover member and the expanding member. As a result, the holding force for the seat back can be further improved, compared with a case where the seat back is held only by the cover member. Accordingly, an unstable movement of the seat back which might occur while moving it between its use position and its rising position can be avoided properly, thereby providing the stable, smooth and certain movement of the seat back.

Also, according to another preferred embodiment, the biasing member is configured of a biasing piece which is pivotally connected to a back face of the seat back at one end thereof around an axis extending in the vehicle width direction and pushes against a face of the cover member which faces to the back face of the seat back by the other end thereof with a sliding contact therewith so as to bias the seat back forward.

Accordingly, the stable, smooth and substantially automatic movement of the seat back between its use position and its rising position can be attained by a simpler structure. Also, since the biasing piece is pivotally connected to the back face of the seat back at one end thereof and pushes against the face of the cover member which faces to the back face of the seat back by the other end thereof with the sliding contact therewith, the biasing piece stays contacting the cover member after the seat back has moved to its rising position. As a result, the biasing piece may not interfere with the seat cushion, and thus the horizontal face of the seat cover after the movement of the seat back and the floor face of the load compartment can be lowered further.

Also, according to another preferred embodiment, the biasing piece is configured of a U-shaped frame, an open-end portion of which is pivotally connected to the back face of the seat back and a closed-end portion of which pushes against and slides over the face of the cover member which faces to the back face of the seat back.

Accordingly, the above-described functions and advantages by the biasing piece can be attained certainly and preferably.

Other features, aspects, and advantages of the present invention will become apparent from the following description of the invention which refers to the accompanying drawings.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Embodiment 1

Figure 1:
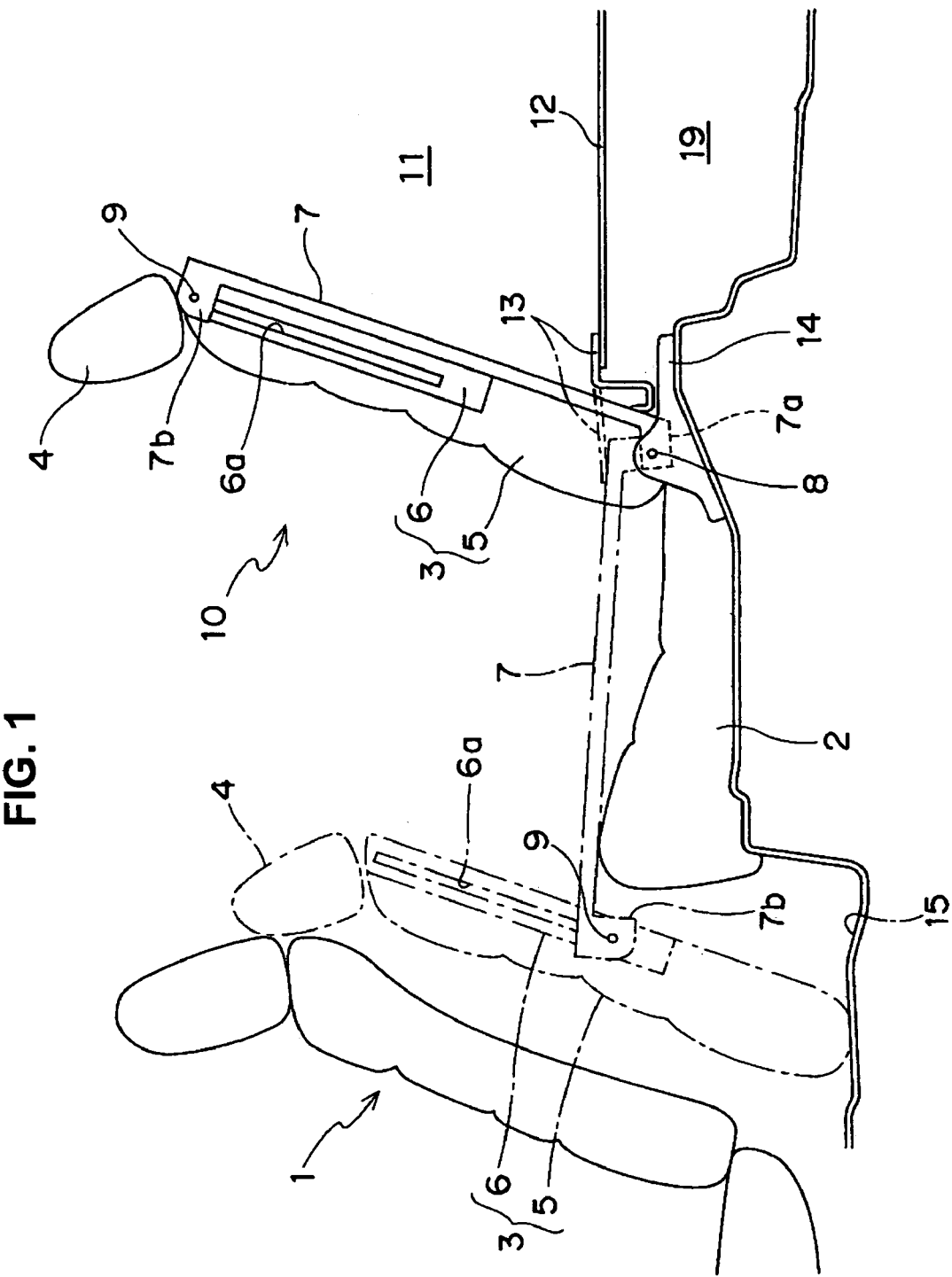
FIG. 1 is a side view showing schematically a movement mechanism of a rear seat of a vehicle according to a first embodiment of the present invention.
Figure 2:
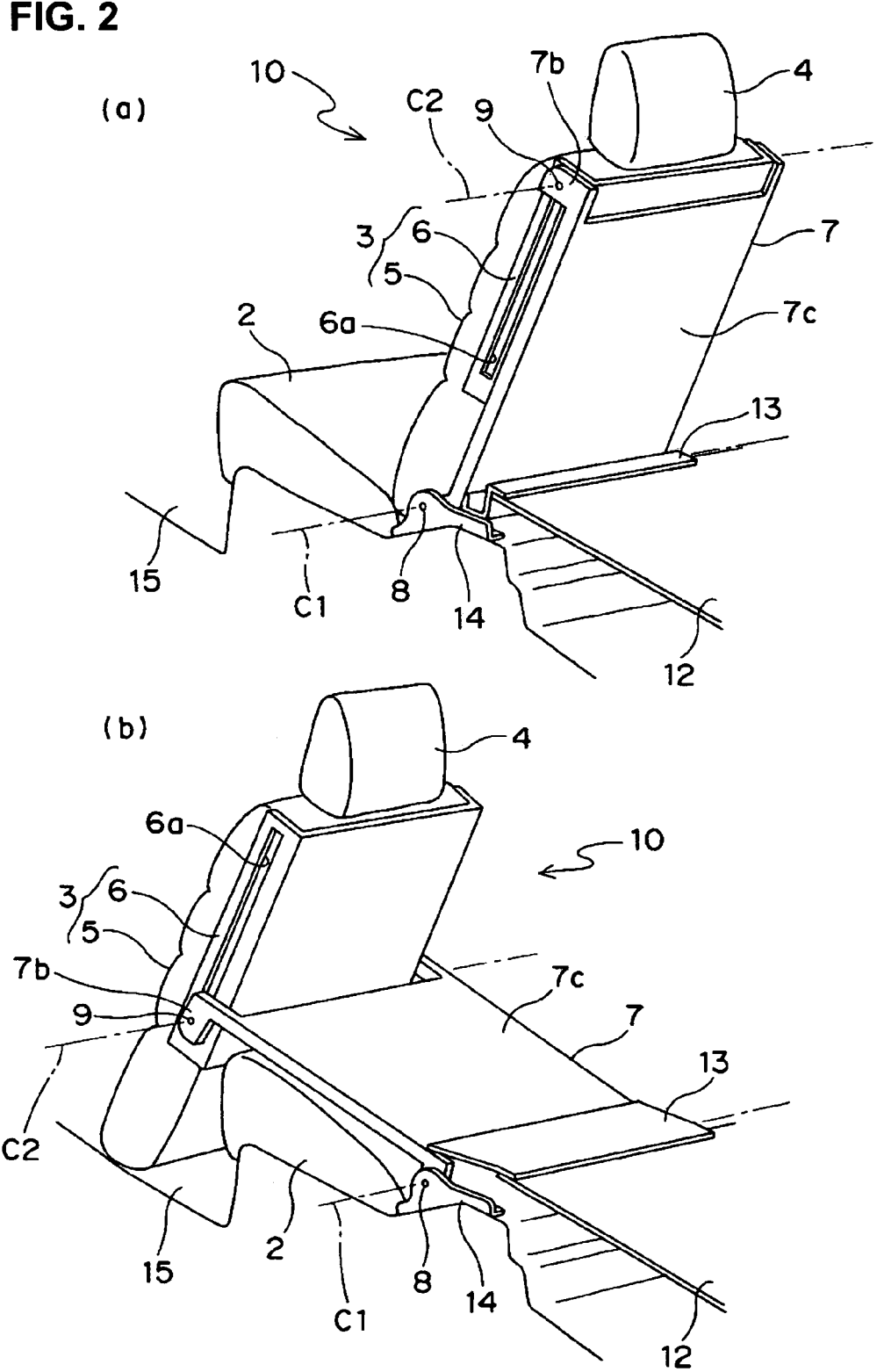
FIG. 2(a) is a perspective view of the rear seat of the vehicle in its use position according to the first embodiment, when viewed from the rear left side.
FIG. 2(b) is a perspective view of the rear seat of the vehicle in its rising position after its movement according to the first embodiment, when viewed from the rear left side.

FIG. 1 is a side view showing a rear seat of a vehicle in its use position (a state where a passenger sits on it) and in its rising position (after its movement) according to a first embodiment of the present invention. The use position of the rear set is illustrated by a solid line, and the rising position thereof is illustrated by a one-dotted broken line. FIG. 2(a) and FIG. 2(b) are respective perspective views of the rear seat of the vehicle in its use position and in its rising position according to the first embodiment, when viewed from the rear left side. A seat denoted by a reference numeral 10 is a rear seat (for example, a third-row seat) which is disposed in front of a load compartment 11 at a vehicle rear. The rear seat 10 is fixed to a specified portion on a floor panel 15 forming a vehicle floor face, and includes a seat cushion 2 which is equipped with a sitting face, a seat back 3 which is equipped with a rest-side face and held so as to rise from a rear end of the seat cushion 2 in its use position, and a headrest 4 which is attached to an upper end face of the seat back 3. The load compartment 11 opens toward the vehicle rear (toward the right side in FIG. 1) and its opening is closed selectively by a tail gate, which is not illustrated here.

Herein, the seat back 3 is configured so as to move forward of the vehicle, leaving the seat cushion 2 fixed to its position. After its movement is completed, as apparent form FIG. 1, the seat back 3 is held to be located in front of the seat cushion 2 and behind a front seat 1 (for example, a second-row seat) which is located before the rear seat 10. Also, it is configured such that there is provided a substantially flat face comprised of part of the rear seat 10 and a floor board 12 which covers over a spare tire pan 19 formed at part of the floor panel 15 and forms a floor face of the load compartment 11.

A structure of the rear seat 10 to provide such movement of the seat back 3 and face forming will be described. There is provided behind the seat back 3 a seat back cover 7 which is equipped with a flat portion 7c covering a mostly whole area of a back face of the seat back 3 and supports the seat back 3. The seat back cover 7 is pivotally connected to a bracket 14, which is disposed on the floor panel 15 at the vicinity of a rear end of the seat cushion 2, via a connecting member 8 at its lower end, and it is rotatable around an axis C1 defined by the connecting member 8. Also, the seat back cover 7 is connected to the seat back 3 via a slider 9 at its upper end, and thereby the seat back 3 is rotatable with respect to the seat back cover 7 around an axis C2 defined by the slider 9. The slider 9 is attached so as to slide along a guide slit 6a which is provided at a side face of the seat back 3.

Herein, the rear seat 10 is configured such that the rearward rotation of the seat back cover 7 around the axis C1 is allowed until a specified angle, i.e., until the use position of the rear seat 10 where the passenger can sit, but its further rotation is prohibited, which is not illustrated here.

As described above, the seat back 3 is connected to the seat back cover 7 via the slider 9 which slides along the guide slit 6a and supported thereby. Thus, according to the forward rotation of the seat back cover 7 around the axis C1, the seat back cover 7 can be rotated with respect to the seat back 3, sliding the slider 9a downward along the guide slit 6a. Accordingly, the seat back 3 can be moved so as to be located in front of the seat cushion 2 and behind the front seat 1. Further, after the movement of the seat back 3 is completed, the seat back cover 7 can be held such that its flat portion 7c is positioned at an approximately horizontal and also the same level as the floor board 12.

Herein, in the present embodiment, there is provided a flexible member 13 which connects a side edge portion of the floor board 12 located near the back face of the seat back cover 7 with a lower end portion of the back face of the seat back cover 7 so as to cover a gap which may occur between the floor board 12 and the seat back cover 7 when the both are located at the same level. The flexible member 13 bends between the board 12 and the seat back cover 7 when the rear seat 10 is in its use position, while it is extended between them to cover the gap when the movement of the seat is completed. Thereby, any articles can be prevented from being drop through the gap during loading and unloading at the load compartment. Also, there can be provided a large and flat load floor face by the seat back cover 7 and the floor board 12.

Figure 3:
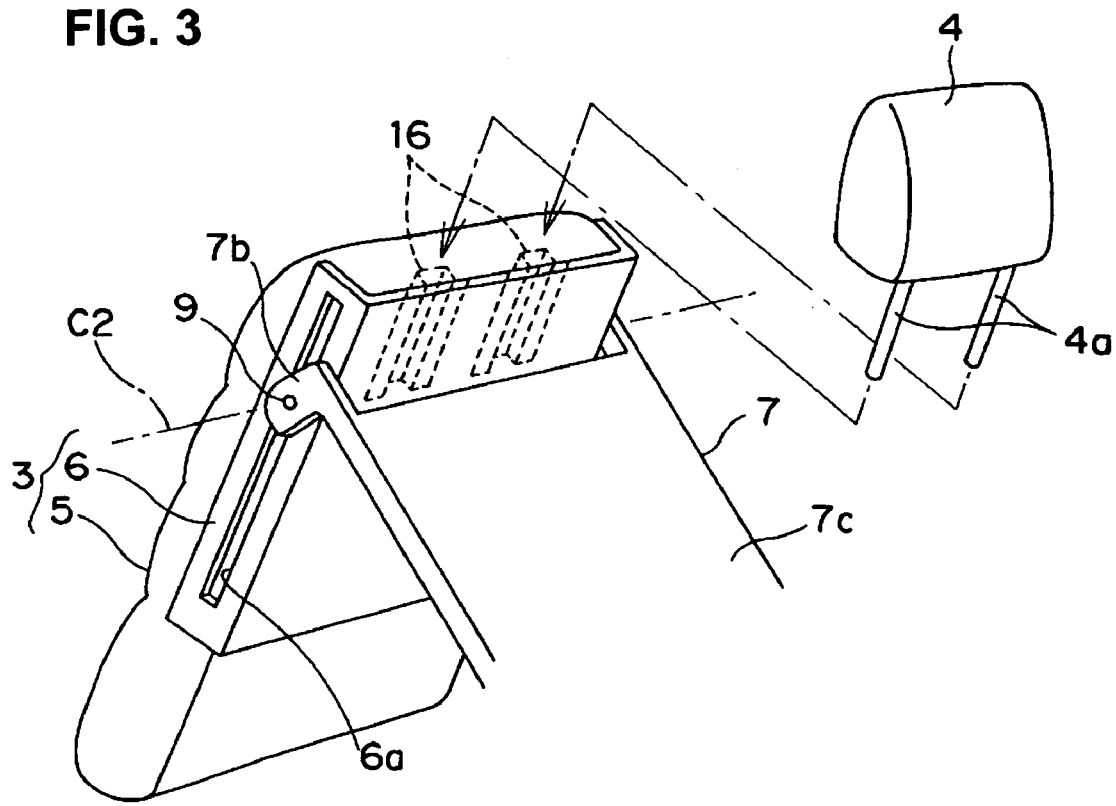
FIG. 3 is a view showing a connecting structure of a seat back cover to the seat back.
Figure 4:
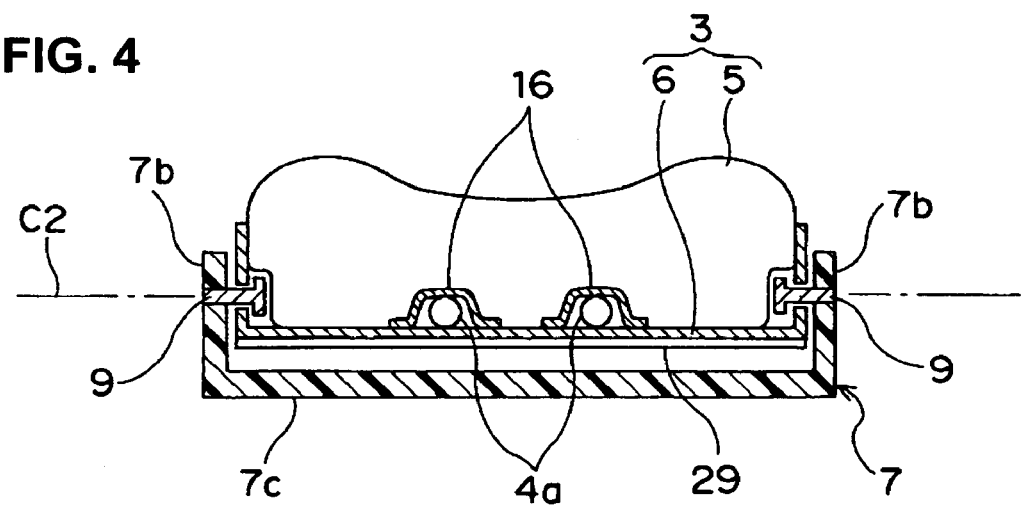
FIG. 4 is sectional explanatory view of the seat back and the seat back cover connected therewith.

The structures of the seat back 3 and the seat back cover 7 will be further described in detail. FIG. 3 shows the detailed structure of the seat back 3. FIG. 4 is a sectional explanatory view of the seat back 3 and the seat back cover 7. The seat back 3 includes basically a cushion member 5 made of, for example, urethane form or the like, and a holding plate 6 which is attached to the cushion member 5 so as to cover its back and side faces and reinforce it. The guide slit 6a is formed at a portion of the holding plate 6 which corresponds to the side face of the cushion member 5 so as to extend in a longitudinal direction of the seat back body. Further, at a face of the holding member 6 which faces to the back face of the cushion member 5, there are provided guide members 16 for receiving headrest frames 4a extending downward from a lower end of the headrest 4. One ends of respective guide members 16 connect with holes (not illustrated) for insert of the headrest frames which are formed at the upper end of the cushion member 5, and thereby the headrest 4 is attached to the seat back 3 by inserting the headrest frames 4 into the guide members 16 through the holes. As shown in FIG. 4, an ornamental textile 29 is stuck to the back face of the holding plate 6.

Further, protrudent pieces 7b are provided at both sides at the upper end of the seat back cover 7 supported behind the seat back 3, protruding forward to face to the respective guide slits 6a of the holding plate 6. The respective protrudent pieces 7b are equipped with respective sliders 9 operative to slide along the guide slits 6a. The seat back cover 7 is coupled to the seat back 3 in such a manner that the respective sliders 9 are installed to the holding plate 6 so as to slide along the corresponding guide slits 6a.

Figure 5:
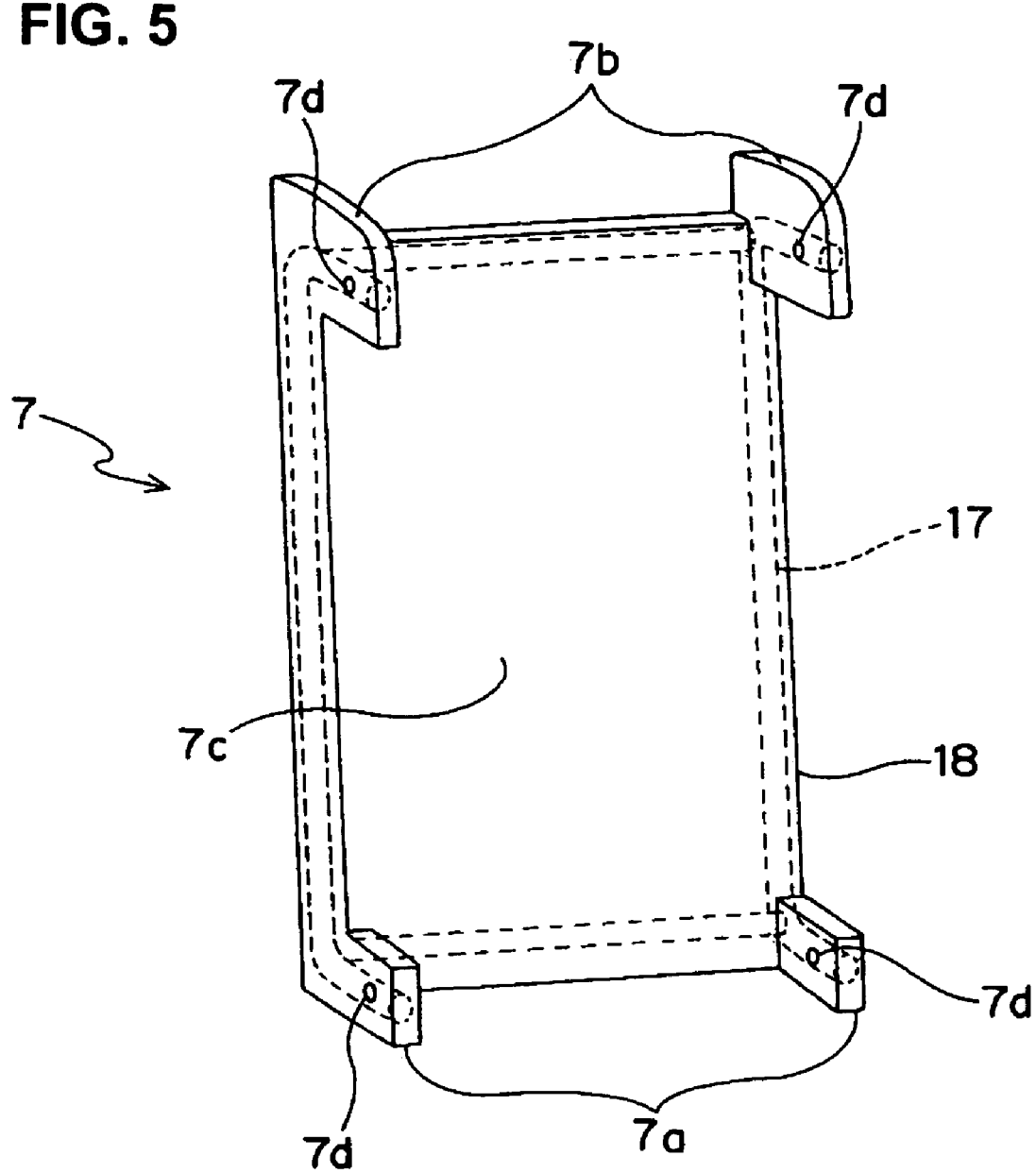
FIG. 5 is a perspective view showing the seat back cover according to the first embodiment.

FIG. 5 is a perspective view of the seat back cover 7 which is detached from the seat back 3 and the floor panel 15. The seat back cover 7 comprises a pipe frame 17 which is made of metal to maintain a sufficient body rigidity and strength, and a cover structure 18 which is made of resin and forms an approximately board-shaped body covering over the pipe frame 17. Also, the seat back cover 7 includes the flat portion 7c which forms the flat face in cooperation with the floor face of the load compartment 11 when the movement of the rear seat 10 is completed, the pair of protrudent pieces 7a which protrude forward from the both sides of its upper end so as to correspond to the side faces of the seat back 3 and a pair of protrudent pieces 7a which protrude forward from the both sides of its lower end so as to correspond to the bracket 14 fixed on the floor panel 15. These protrudent pieces 7a, 7b have insertion holes 7d respectively which penetrate the cover structure 18 and the pipe frame 17 in the vehicle width direction. The seat back cover 7 is pivotally connected to the bracket 14 and the seat back 3 respectively at the upper and lower ends via the connecting members 18 and the sliders 9 which are inserted into the insertion holes 7d.

Herein, the seat back cover may not limited to the above-described structure. For example, other structures can be adopted, such as the one in which the pipe frame 17 and the cover structure 18 are formed integrally of resin, or the one in which the pipe frame 17 is rapped by a leather or the like.

According to the rear seat 10 described above, as apparent from FIG. 1, the seat back cover 7 is rotated forward around the axis C1, supporting the seat back 3. At this moment, the sliders 9 slide along the guide slits 6a and then the seat back 3 is rotated with respect to the seat back cover 7 around the axis C2 defined by the sliders 9. Thereby, the seat back 3 can be moved so as to be located in its rising position in front of the seat cushion 2 and behind the front seat 1. Thus, the substantially horizontal face can be formed at the lower level by the seat back cover 7, without moving the seat cushion 2. Further, since the horizontal face forms the flat face in cooperation with the floor board 12 forming the floor face of the load compartment 11, the large load compartment 11 which can place long loads and the like stably therein and provide easy loading and unloading from the tail-gate side can be obtained. Further, the seat back 3 can be stored properly by effectively utilizing the dead space in front of the seat cushion 2.

Further, since the pipe frame 17 to support the seat back 3 so as to hold the passenger is installed into the seat back cover 7 and the seat back 3 includes the cushion member 5 and the holding plate 6 including the guide slits 6a, the seat back 3 can be formed lightly and thereby the operation of moving the rear seat 10 can be facilitated.

Subsequently, modified embodiments of the present invention will be described. Hereinafter, the same structure of the modified embodiments as the above-described first embodiment will have the same reference numerals as those of the first embodiment, and detailed description on those will be omitted.

Embodiment 2

Figure 6:
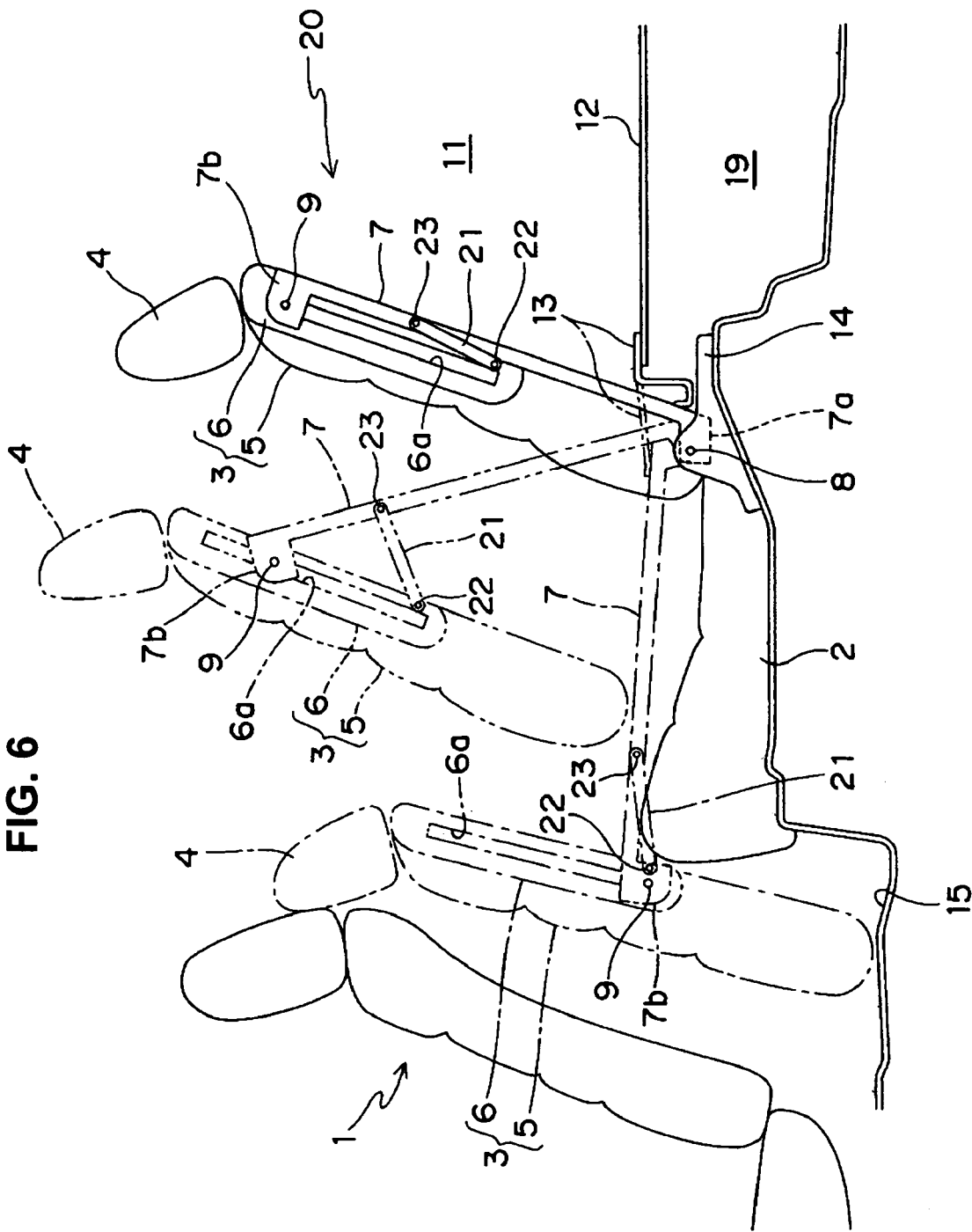
FIG. 6 is a side view showing schematically a movement mechanism of a rear seat according to a second embodiment of the present invention.

FIG. 6 is a side view showing schematically a movement mechanism of a rear seat 20 according to a second embodiment of the present invention. Respective positions of the rear seat 20 during its forward movement are illustrated by a one-dotted broken line and a two-doted broken line, respectively. FIG. 7(a) and FIG. 7(b) are perspective views of the rear seat 20 located respectively in its use position and in its rising position after its movement according to the second embodiment, when viewed from the rear left side. In the second embodiment, there is further provided a link member 21 to move the seat back 3 stably and smoothly, in addition to the structure of the first embodiment described above.

The link member 21 is pivotally connected to the vicinity of the lower end of the guide slit 6a which is provided at the side face of the seat back 3, more specifically the holding plate 6, via a connecting member 22 at one end thereof, and thereby it can rotate around an axis C3 defined by the connecting member 22. Meanwhile, the link member 21 is pivotally connected to the side face of the seat back cover 7 via a connecting member 23 at the other end thereof, and thereby it can rotate around an axis C4 defined by the connecting member 23.

Figure 7:
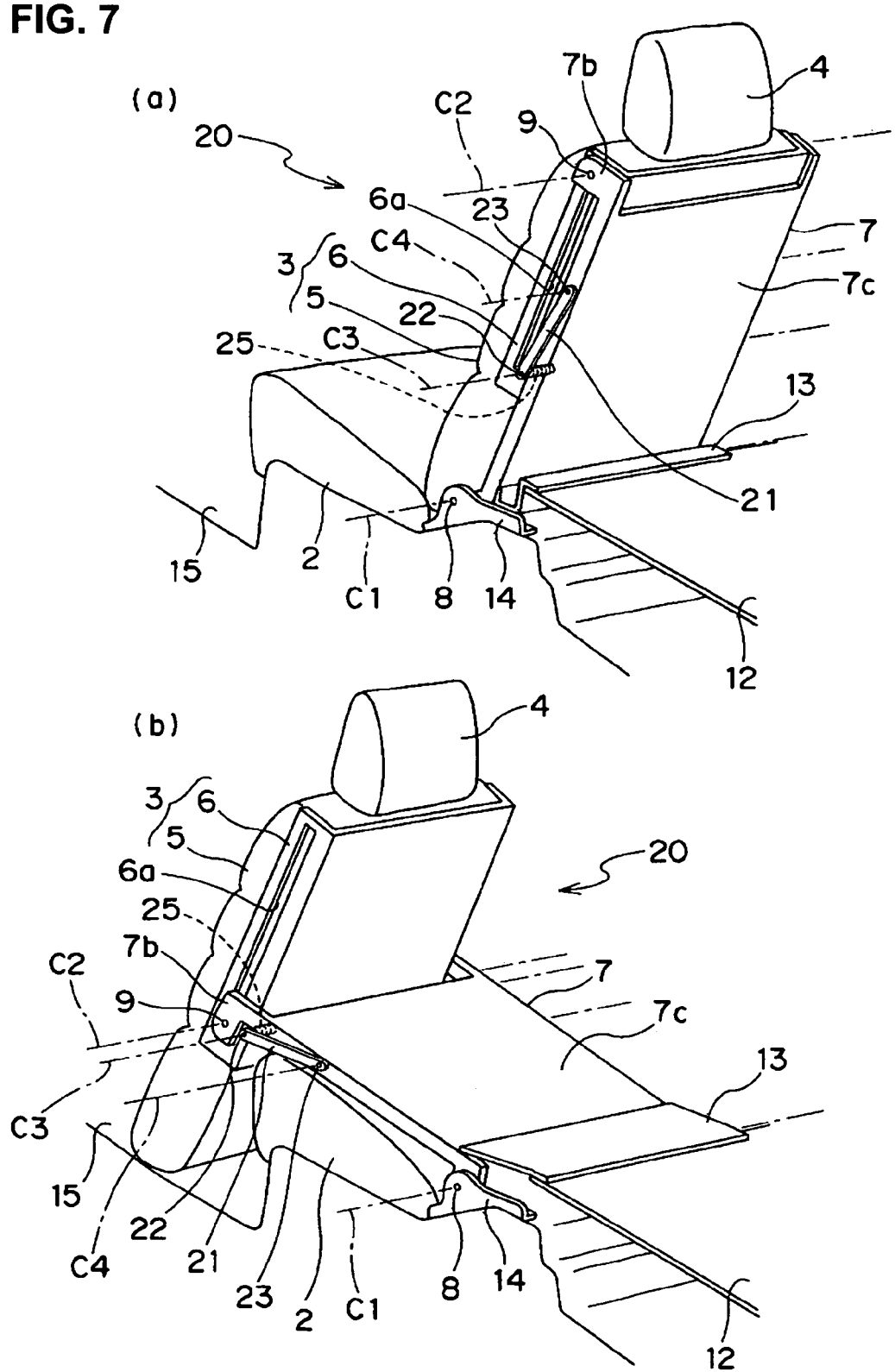
FIG. 7(a) is a perspective view of the rear seat of the vehicle in its use position according to the second embodiment, when viewed from the rear left side.
FIG. 7(b) is a perspective view of the rear seat of the vehicle in its rising position after its movement according to the second embodiment, when viewed from the rear left side.

Herein, only the link member 21 located at the left side of the vehicle is illustrated in FIG. 7, but the same link member is also provided at the right side likewise. Herein, the link member may be provided only at either one side if it could provide an enough strength.

Figure 8:
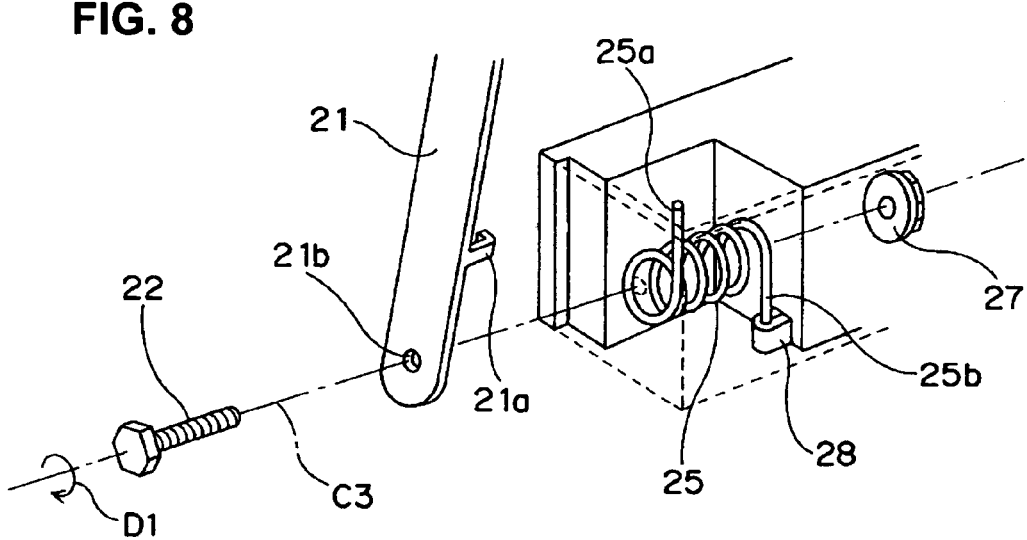
FIG. 8 is a view showing a connecting structure of a link member to a side face of a seat back according to the second embodiment.

A torsion spring 25 is installed at the connecting portion of the link member 21 to the side face of the seat back 3 as a biasing member which can bias the seat back 3 toward the vehicle front. The connecting structure with the torsion spring 25 of the link member 21 to the side face of the seat back 3 is illustrated in FIG. 8. The torsion spring 25 is installed inside the seat back 3 (not illustrated in FIG. 8) at the connecting portion of the link member 21 to the seat back 3 in the second embodiment. The torsion spring 25 is held by a spring holding portion 28 at one end (denoted by 25$b$), and engaged with the link member 21 operative to provide a biasing force with the link member 21 at the other end (denoted by 25$a$).

There is provided a hole portion 21$b$ for inserting the connecting member 22 therein at a lower end portion of the link member 21, and an engagement piece 21$a$ to engage with the end portion 25$a$ of the torsion spring 25 is provided at an edge portion above the hole portion 21$b$. The link member 21 is coupled to the side face of the seat back 3 via the connecting member 22 (herein, a bolt) and a nut 27 in the state where the engagement piece 21$a$ engages with the end portion 25 of the torsion spring 25. Thereby, the link member 21 is biased in an arrow D1 direction around the axis C3 defined by the connecting member 22.

Figure 9:
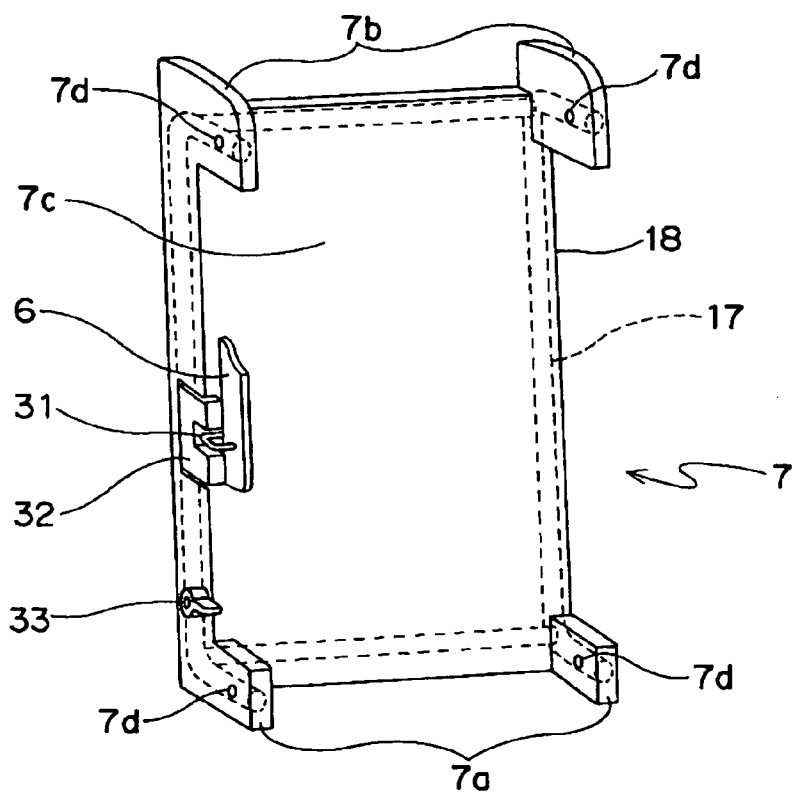
FIG. 9 is a perspective view showing a seat back cover according to the second embodiment.
Figure 10:
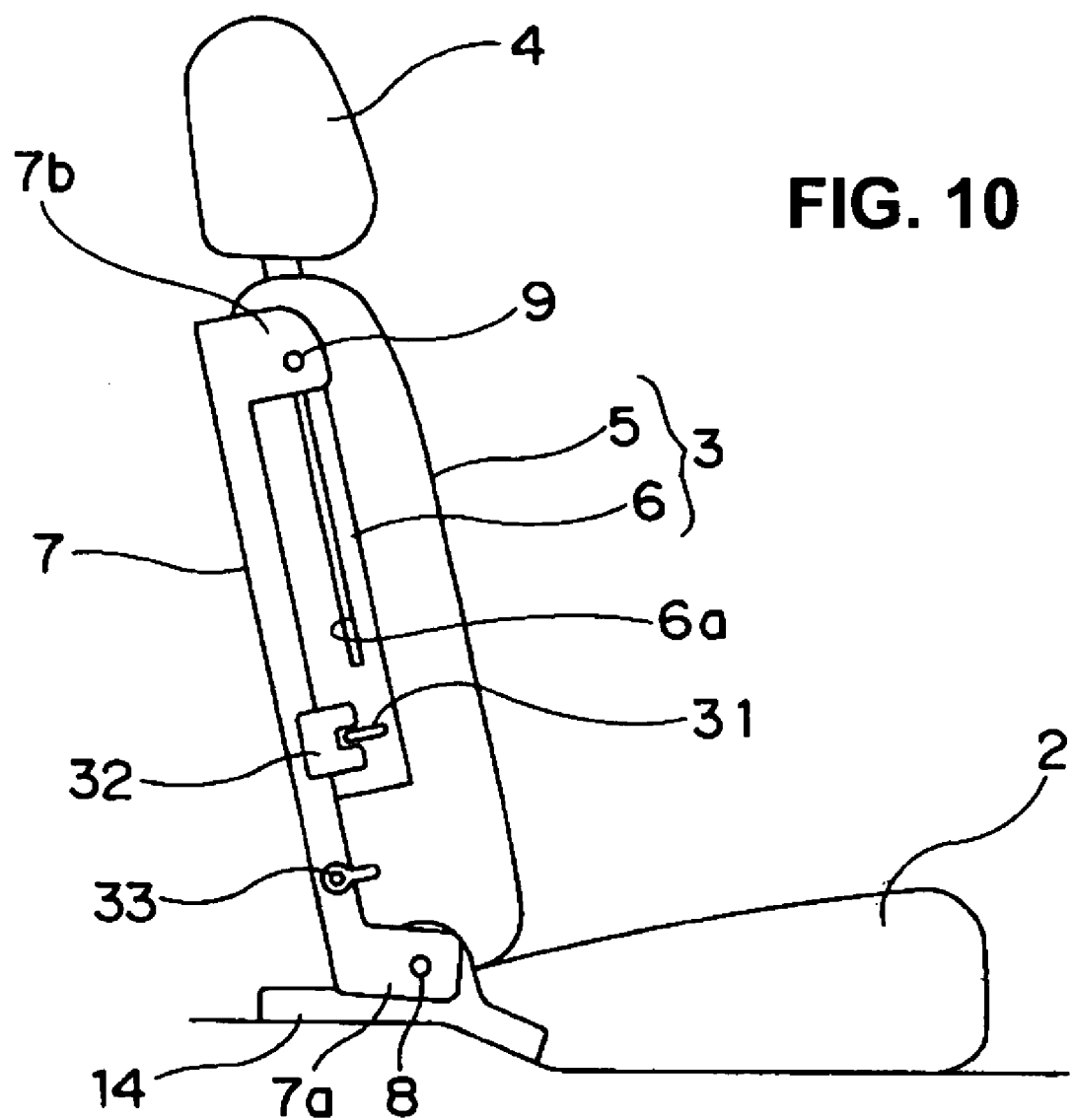
FIG. 10 is a side view of a latch mechanism.

In order to limit the movement of the seat back 3 caused by the biasing force of the torsion spring 25 in the use position of rear seat 20, there is provided a latch mechanism engaging between the holding plate 6 and the seat back cover 7 in the second embodiment. FIGS. 9 and 10 are a perspective view and a side view respectively showing the holding plate 6 and the seat back cover 7 which are equipped with the latch mechanism. A striker 31 is provided at the outside of the face of the holding plate 6 which faces to the side face of the cushion member 5 (see FIG. 10). Meanwhile, a latch 32 operative to engage with the striker 31 is provided at the side portion of the seat back cover 7 which corresponds to the striker 31 at the holding plate 6. Further, the seat back cover 7 is provided with an operational lever 33 to release (unlatch) the latch via a wire (not illustrated) below the latch 32. It is preferred that the operational lever 33 is located at a portion which is easy to access from the front and the rear of the load compartment. Herein, the release of the latch 32 should not be limited to the manual operation of the operational lever 33, and it may be conducted by a remote control.

The seat back cover 7 is held in the use position of the rear seat 20, i.e., in its rising position behind the seat back 3 along with the seat back 3 by the engagement of the striker 31 with the latch 32. When the operational lever 33 is operated, this engagement is released (unlatched), and then the seat back 3 is moved in such a manner that its lower end is pushed forward by the biasing force of the torsion spring 25. Accordingly, the slider 9 interconnecting the seat back cover 7 and the seat back 3 slides downward along the guide slit 6$a$. Then, when the seat back cover 7 is rotated forward, the seat back 3 is located in front of the seat cushion 2 and behind the front seat 1. At the same time, the seat back cover 7 forms the substantially flat face by the back face of the flat portion 7$c$ in cooperation with the floor board 12 constituting the floor face of the load compartment 11.

According to the second embodiment, as described above, by the link member 21 connecting the seat back 3 with the seat back cover 7, the position of the seat back 3 can be controlled with respect to the seat back cover 7 while moving the seat back 3, and thereby it can be moved properly between its use position and its rising position, holding the seat back 3 stably to keep its rising position. Also, the seat back 3 can be moved smoothly without any contact or interference with another seat (specifically, the front seat 1). Further, the biasing force of the torsion spring 25 can provide the seat back 3 with a substantially automatic movement in the second embodiment when the latch 32 is released by the operational lever 33, and thereby the load compartment can be enlarged easily by a simple assistant operation.

Figure 11:
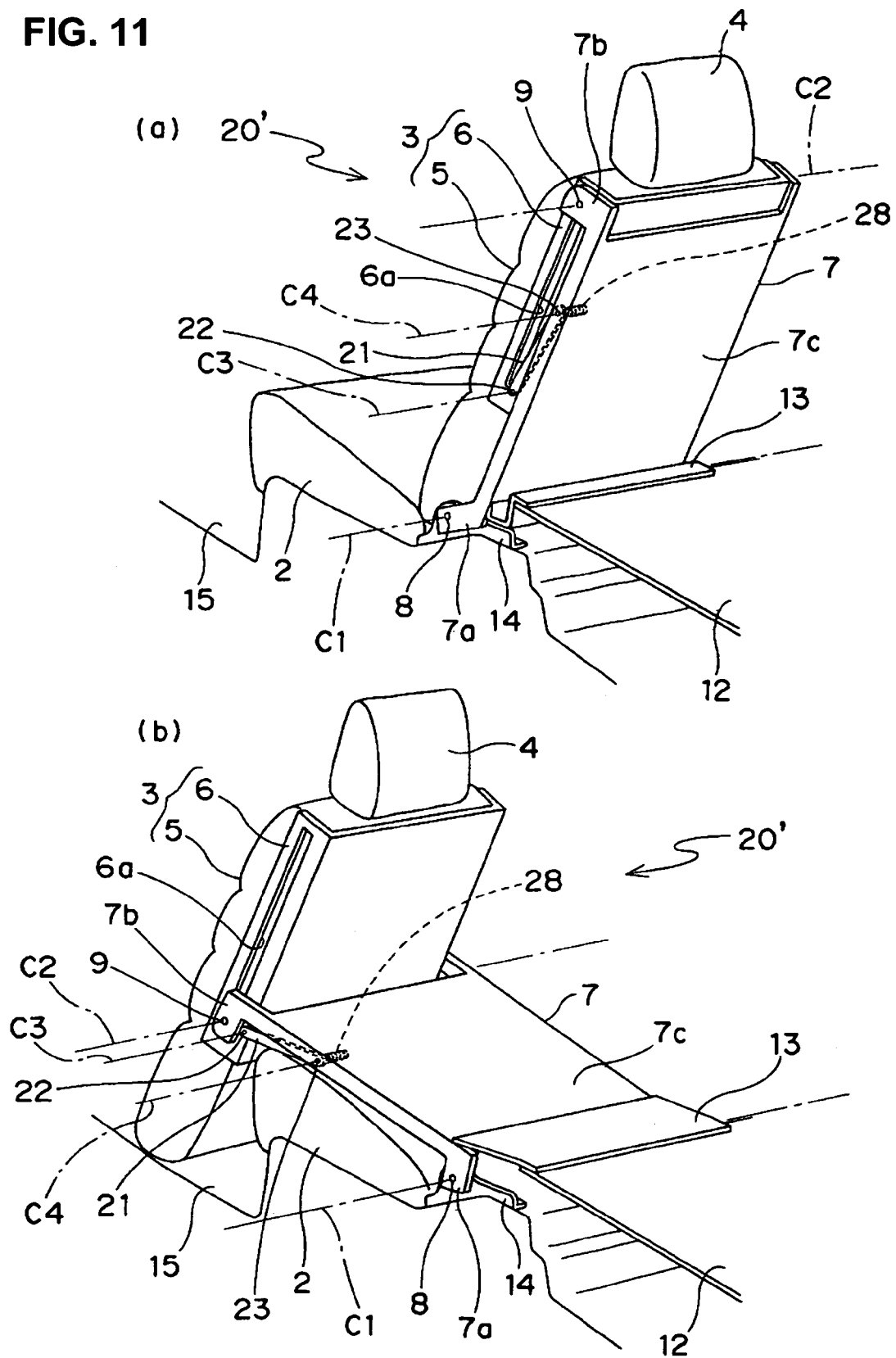
FIG. 11(a) is a perspective view of a rear seat of the vehicle in its use position according to a modified embodiment of the second embodiment, when viewed from the rear left side.
FIG. 11(b) is a perspective view of a rear seat of the vehicle in its rising position after its movement according to the modified embodiment of the second embodiment, when viewed from the rear left side.

The above-described embodiment shows the installment of the torsion spring 25 at the connection portion to the link member 21, but it should not be limited to this installment. For example, as a rear seat 20' shown in FIGS. 11($a$) and 11($b$), a torsion spring 28 may be installed at a connection portion of the link member 21 to the side face of the seat back cover 7. In this case, it is preferred that the link member 21 is located inside the seat back cover 7 (near the seat back 3) and the protrudent piece 7$a$ at the lower end of the seat back cover 7 is located outside the bracket 14 (away from the seat back 3), which is different from the above-described first embodiment.

Embodiment 3

Figure 12:
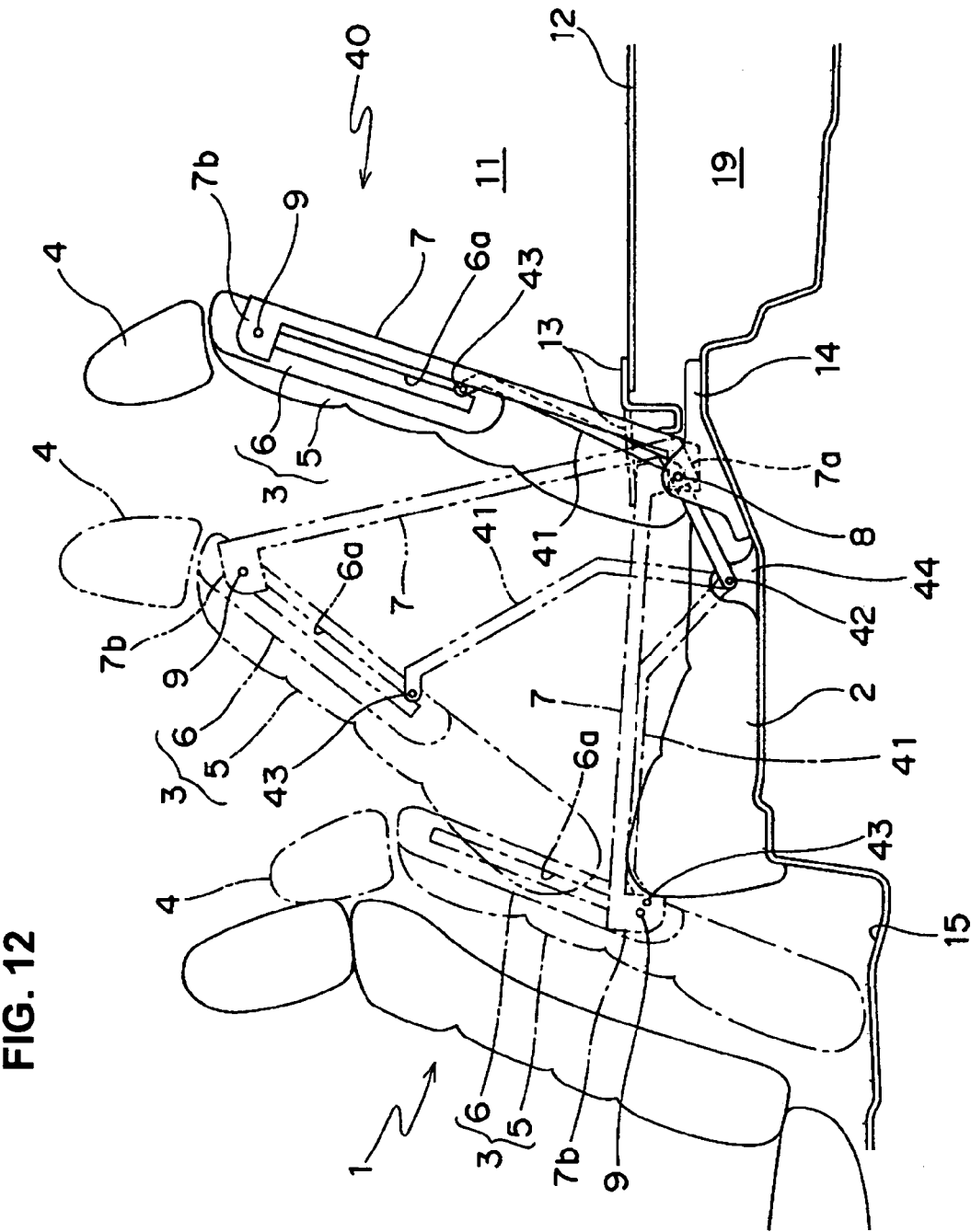
FIG. 12 is a side view showing schematically a movement mechanism of a rear seat according to a third embodiment of the present invention.
Figure 13:
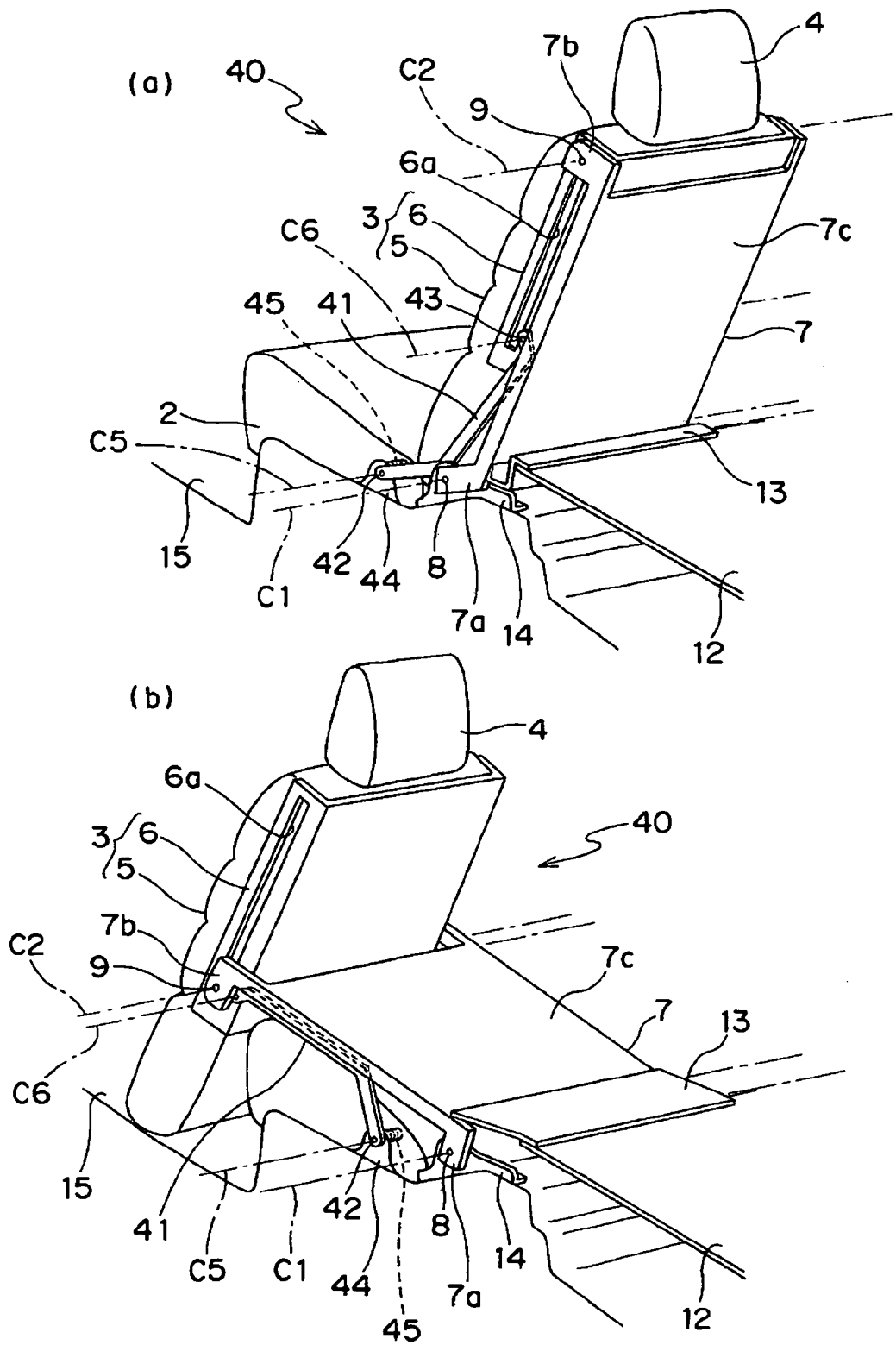
FIG. 13(a) is a perspective view of the rear seat of the vehicle in its use position according to the third embodiment, when viewed from the rear left side.
FIG. 13(b) is a perspective view of the rear seat of the vehicle in its rising position after its movement according to the third embodiment, when viewed from the rear left side.

FIG. 12 is a side view showing schematically a movement mechanism of a rear seat 40 according to a third embodiment of the present invention. FIG. 13($a$) and FIG. 13($b$) are perspective views of the rear seat 40 located respectively in its use position and in its rising position after its movement according to the third embodiment, when viewed from the rear left side. In the third embodiment, there is further provided a support member 41 to move the seat back 3 stably, in addition to the structure of the first embodiment described above.

The support member 41 is pivotally connected to a bracket 44, which is disposed on the floor panel 15 before the bracket 14 provided for the seat back cover 7 at the side of the seat cushion 2, via a connecting member 42 at its lower end, and it is rotatable around an axis C5 defined by the connecting member 42. Also, the support member 41 is connected to the vicinity of the lower end of the guide split 6$a$ at the side face of the holding plate 6 via a connecting member 43 at its upper end, and thereby the seat back 3 is rotatable with respect to the connecting member 43 around an axis C6 defined by the connecting member 43.

The support member 41 is, as apparent from FIG. 12, configured so as to extend approximately along the side portions of the seat cushion 2 and the seat back 3 without preventing the passenger from sitting. The third embodiment shows the support member 41 having its bent middle portion, but it should not limited to this structure. For example, the support member with a curved or other-shaped figure may be used.

Herein, only the support member 41 located at the left side of the vehicle is illustrated in FIGS. 12 and 13, but the same support member is also provided at the right side likewise. Herein, the support member may be provided only at either one side if it could provide an enough strength.

Figure 14:
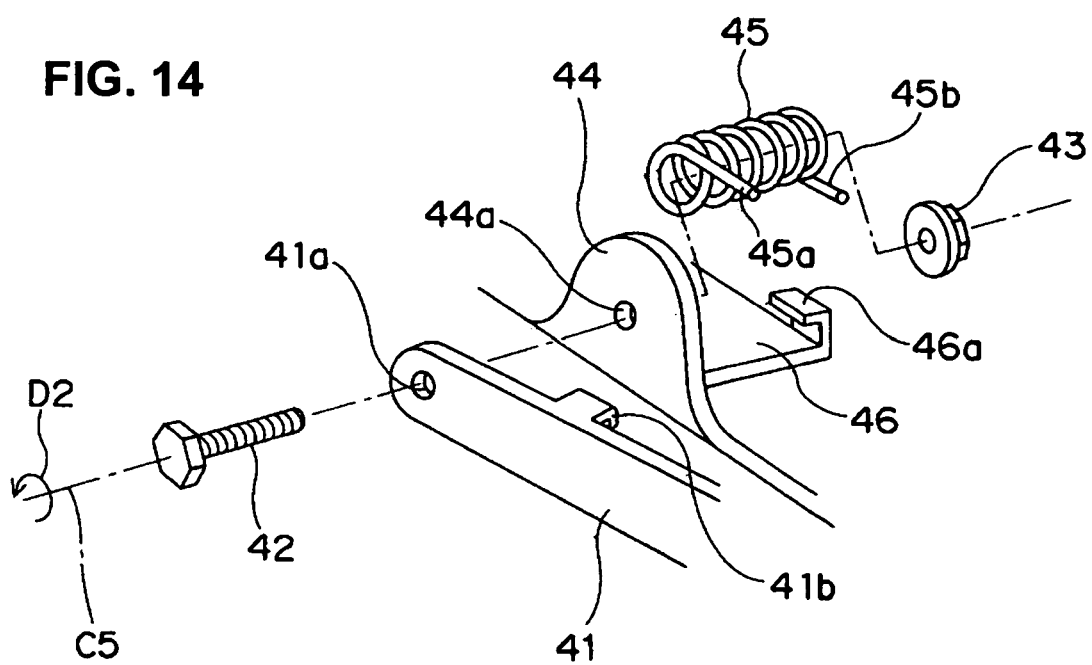
FIG. 14 is a view showing a connecting structure of a support member to a bracket according to the third embodiment.

A torsion spring 45 is installed at the connecting portion of the support member 41 to the bracket 44 provided at the side of the seat cushion as a biasing member which can bias the seat back 3 toward the vehicle front. The connecting structure with the torsion spring 45 of the support member 41 to the bracket 44 is illustrated in FIG. 14. The bracket 44 is provided at the side of the seat cushion 2, and other parts integrated therewith including the torsion spring 45 are installed inside the seat cushion 2. The bracket 44 includes a spring support portion 46 at an inside face thereof (i.e., non-exposed face), which extends inward and horizontally, and the torsion spring 45 is held in a specified position on the spring support portion 46 so as to face to a hole 44*a* for receiving a connecting member which is formed at the bracket 44. There is provided an engagement piece 46*a* to hold an end portion 45*b* of the torsion spring 45 at the inside end (at the seat-side end) of the torsion spring support portion 46. The torsion spring 45 is engaged with the engagement piece 46*a* at one end (denoted by 45*b*), and engaged with the support member 41 operative to provide a biasing force with the support member 41 at the other end (denoted by 45*a*).

There is provided a hole portion 41*a* for inserting the connecting member 42 therein at a lower end portion of the support member 41, and an engagement piece 41*b* to engage with the end portion 45*a* of the torsion spring 45 is provided at an edge portion above the hole portion 41*a*. The support member 41 is coupled to the bracket 44 via a bolt as the connecting member 42 and a nut 43 in the state where the end portion of the torsion spring 45 engages with the engagement piece 41*b*. Thereby, the support member 41 is biased in an arrow D2 direction (in a direction where the seat back 3 is pushed forward) around the axis C5 defined by the connecting member 42.

Although not illustrated here, in order to limit the movement of the seat back caused by the biasing force of the torsion spring, there is also provided the same latch mechanism as the second embodiment engaging between the holding plate 6 and the seat back cover 7 in the third embodiment.

When the latch mechanism is unlatched, the seat back 3 is moved in such a manner that it is pushed forward via the support member 41 by the biasing force of the torsion spring 45 installed at the connecting portion of the support member 14 to the bracket 44. Accordingly, the seat back cover 7 is rotated forward, and the slider 9 interconnecting the seat back cover 7 and the seat back 3 slides downward along the guide slit 6*a*. Then, when the seat back cover 7 is rotated forward, the seat back 3 is located in front of the seat cushion 2 and behind the front seat 1. At the same time, after the movement is completed, the seat back cover 7 forms the substantially flat face by the back face of the flat portion 7*c* in cooperation with the floor board 12 constituting the floor face of the load compartment 11.

According to the third embodiment, as described above, since the seat back 3 is supported by the seat back cover 7 and the support member 41 which are both connected to the floor panel 15, it can be held stably and moved between its use position and its rising position. Also, the movement of the seat back 3 can be controlled more properly in respective positions, compared to the first embodiment in which the seat back 3 is supported only by the seat back cover 7, thereby providing more stable holding of the seat back 3. Further, the seat back 3 can be moved smoothly without any contact or interference with another seat (specifically, the front seat 1).

Further, the biasing force of the torsion spring 45 can provide the seat back 3 with a substantially automatic movement in the third embodiment when the latch is released by the operational lever, and thereby the load compartment can be enlarged easily by a simple assistant operation.

Embodiment 4

Figure 15:
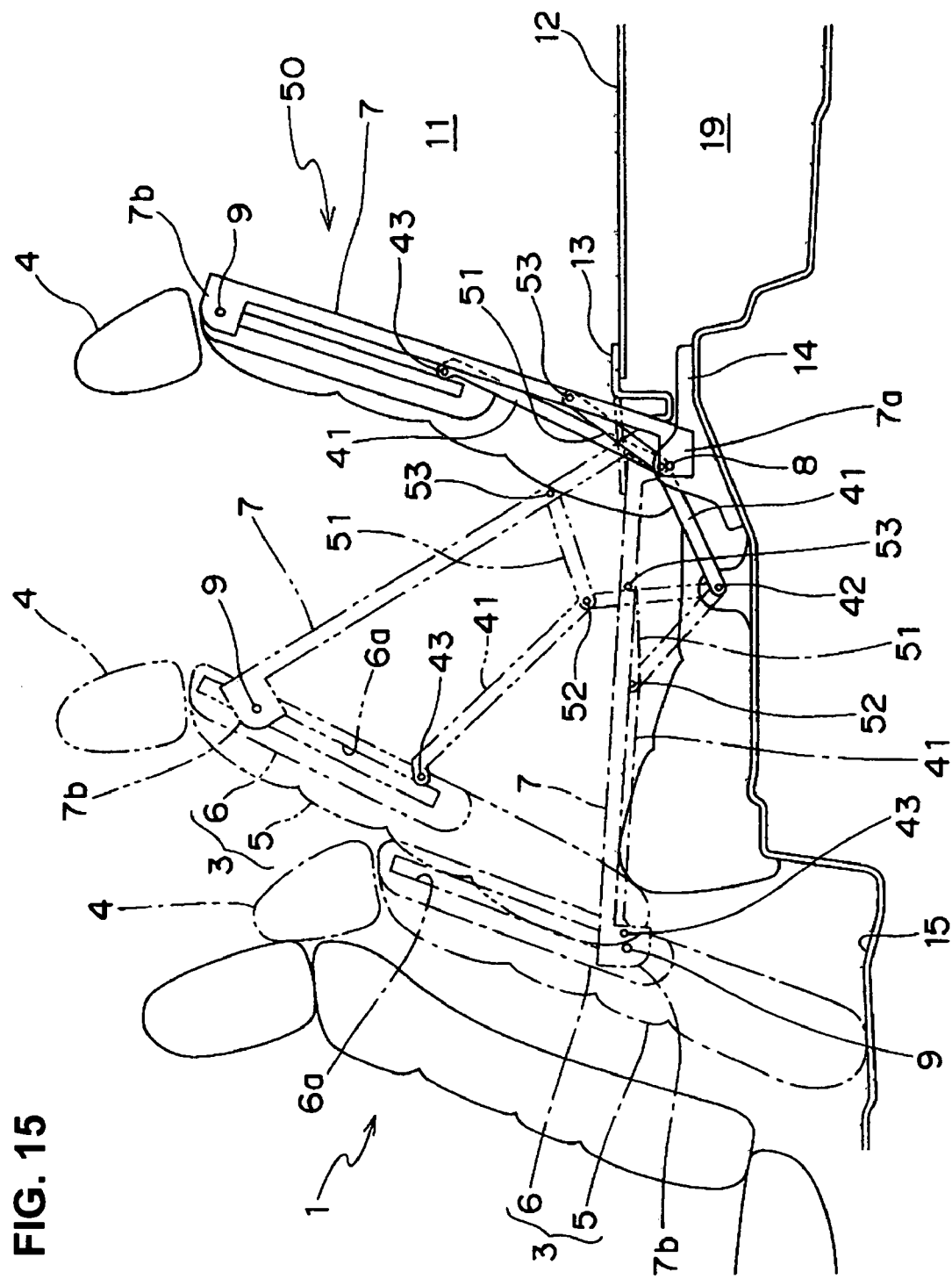
FIG. 15 is a side view showing schematically a movement mechanism of a rear seat according to a fourth embodiment of the present invention.
Figure 16:
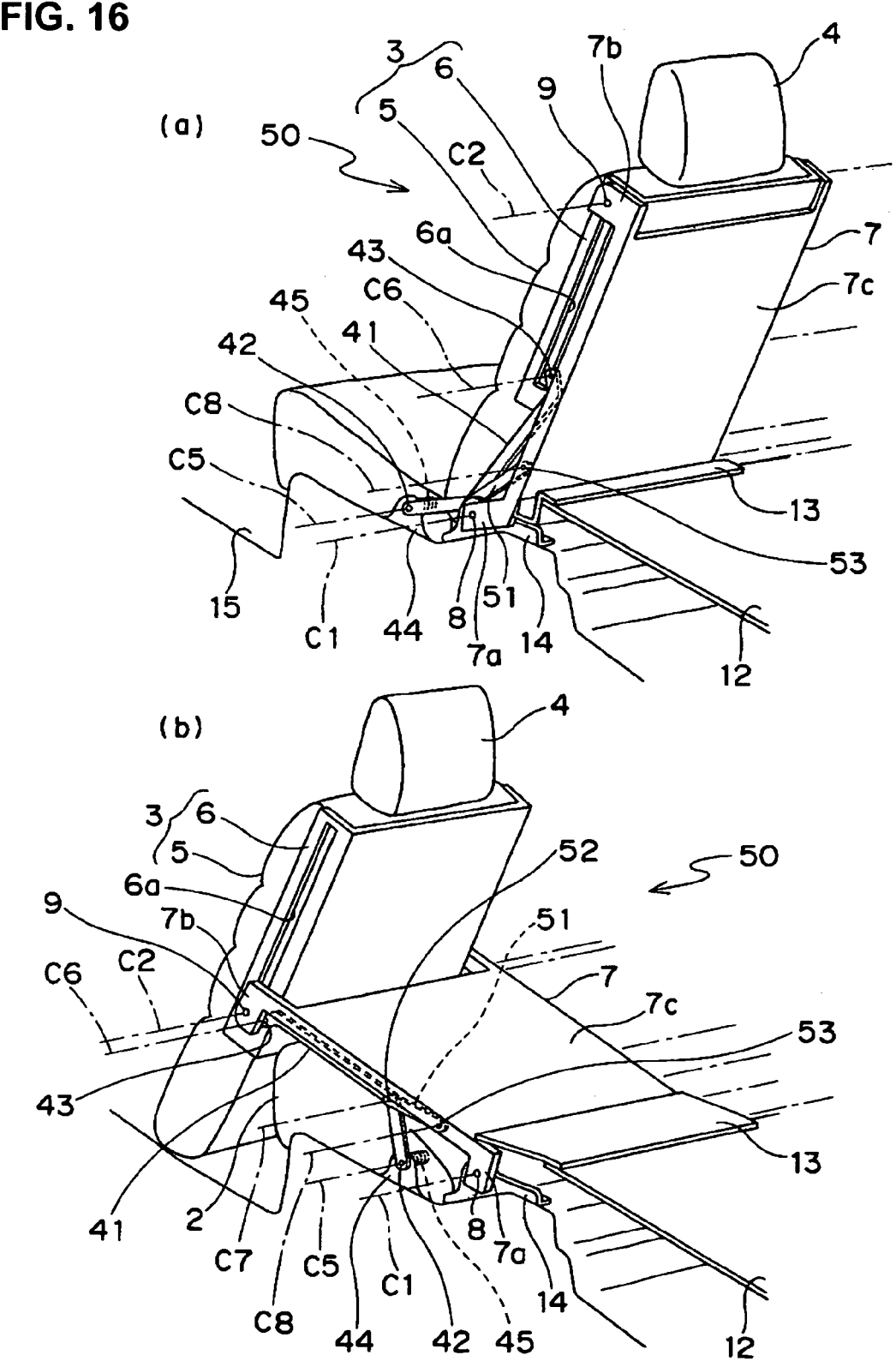
FIG. 16(a) is a perspective view of the rear seat of the vehicle in its use position according to the fourth embodiment, when viewed from the rear left side.
FIG. 16(b) is a perspective view of the rear seat of the vehicle in its rising position after its movement according to the fourth embodiment, when viewed from the rear left side.

FIG. 15 is a side view showing schematically a movement mechanism of a rear seat 50 according to a fourth embodiment of the present invention. FIG. 16(*a*) and FIG. 16(*b*) are perspective views of the rear seat 50 located respectively in its use position and in its rising position after its movement according to the fourth embodiment, when viewed from the rear left side. In the fourth embodiment, in order to move the seat back 3 further smoothly and stably, avoiding any contact and interference with another seat back, there is further provided a link member 51 which connects the support member 41 with the seat back cover 7 in addition to the structure of the third embodiment described above.

The link member 51 is pivotally connected to a middle portion of the support member 41 in its longitudinal direction via a connecting member 52 at its one end, and it is rotatable around an axis C7 defined by the connecting member 52. Also, the link member 51 is connected to a middle portion of the side face of the seat back cover 7 in its longitudinal direction via a connecting member 53 at its other end, and it is rotatable with respect to the seat back cover 7 around an axis C8 defined by the connecting member 53.

Accordingly, since the support member 41 and the seat back cover 7 are interconnected by the link member 51, the movement of the seat back 3 can be controlled properly in respective rising positions during its movement, and thereby it can be held stably and moved between its use position and its rising position. Further, the seat back 3 can be moved further smoothly without any contact or interference with another seat (specifically, the front seat 1).

Further, the biasing force of the torsion spring 45 can provide the seat back 3 with a substantially automatic movement in the fourth embodiment when the latch is released by the operational lever, and thereby the load compartment can be enlarged easily by a simple assistant operation.

Figure 17:
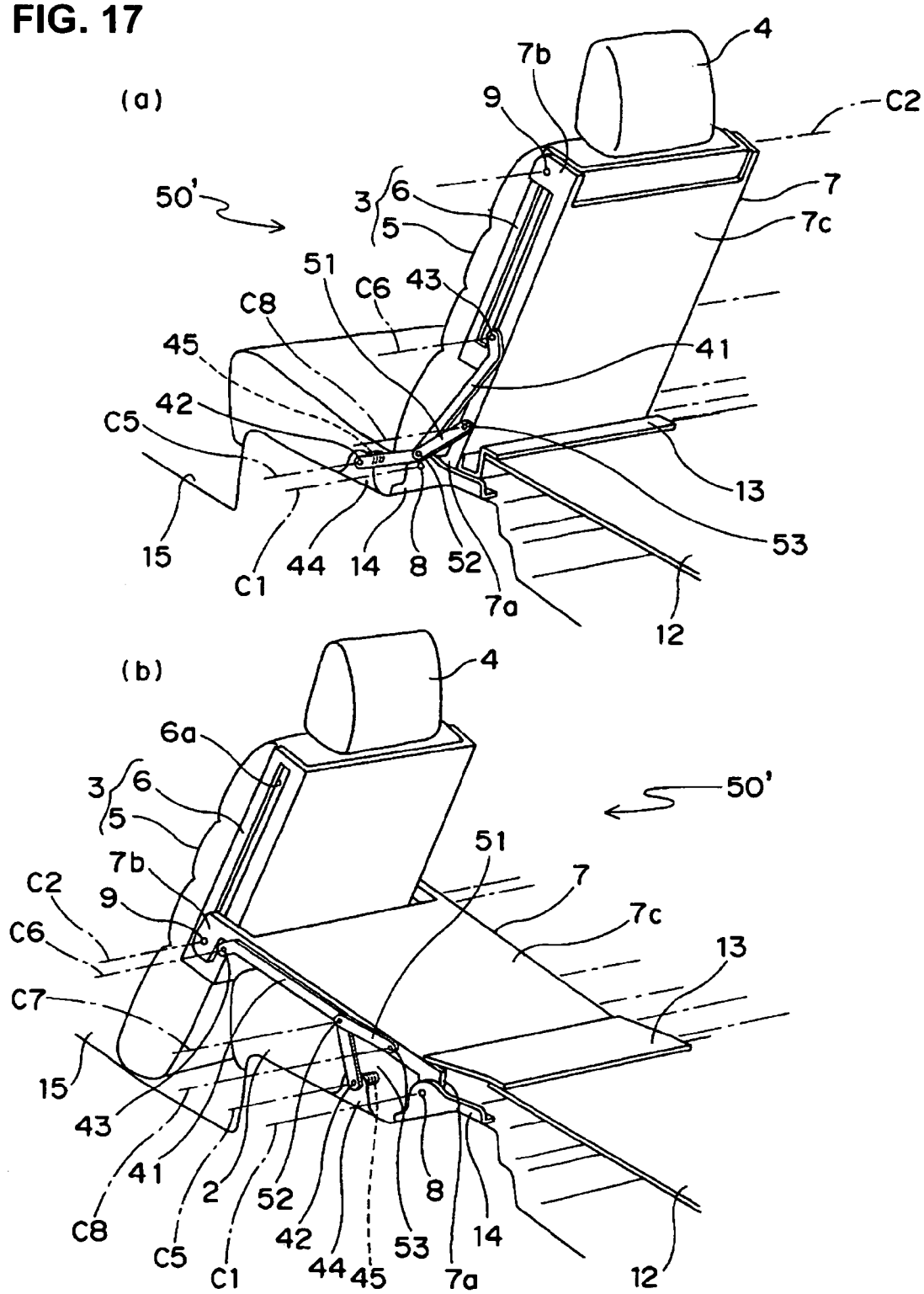
FIG. 17(a) is a perspective view of a rear seat of the vehicle in its use position according to a modified embodiment of the fourth embodiment, when viewed from the rear left side.
FIG. 17(b) is a perspective view of a rear seat of the vehicle in its rising position after its movement according to the modified embodiment of the fourth embodiment, when viewed from the rear left side.

In the above-described embodiment, as apparent from FIG. 16, the support member 41 and the link member 51 are located inside the bracket 14 (near the seat back 3) to which the seat back cover 7 is connected at its lower end, and the protrudent piece 7*a* at the lower end of the seat back cover 7 is located outside the bracket 14 (away from the seat back 3). However, another structure may be adopted. For example, as a rear seat 50' shown in FIGS. 17(*a*) and 17(*b*), the support member 41 and the link member 51 are located outside the bracket 14, and the protrudent piece 7*a* is located inside the bracket 14.

Embodiment 5

Figure 18:
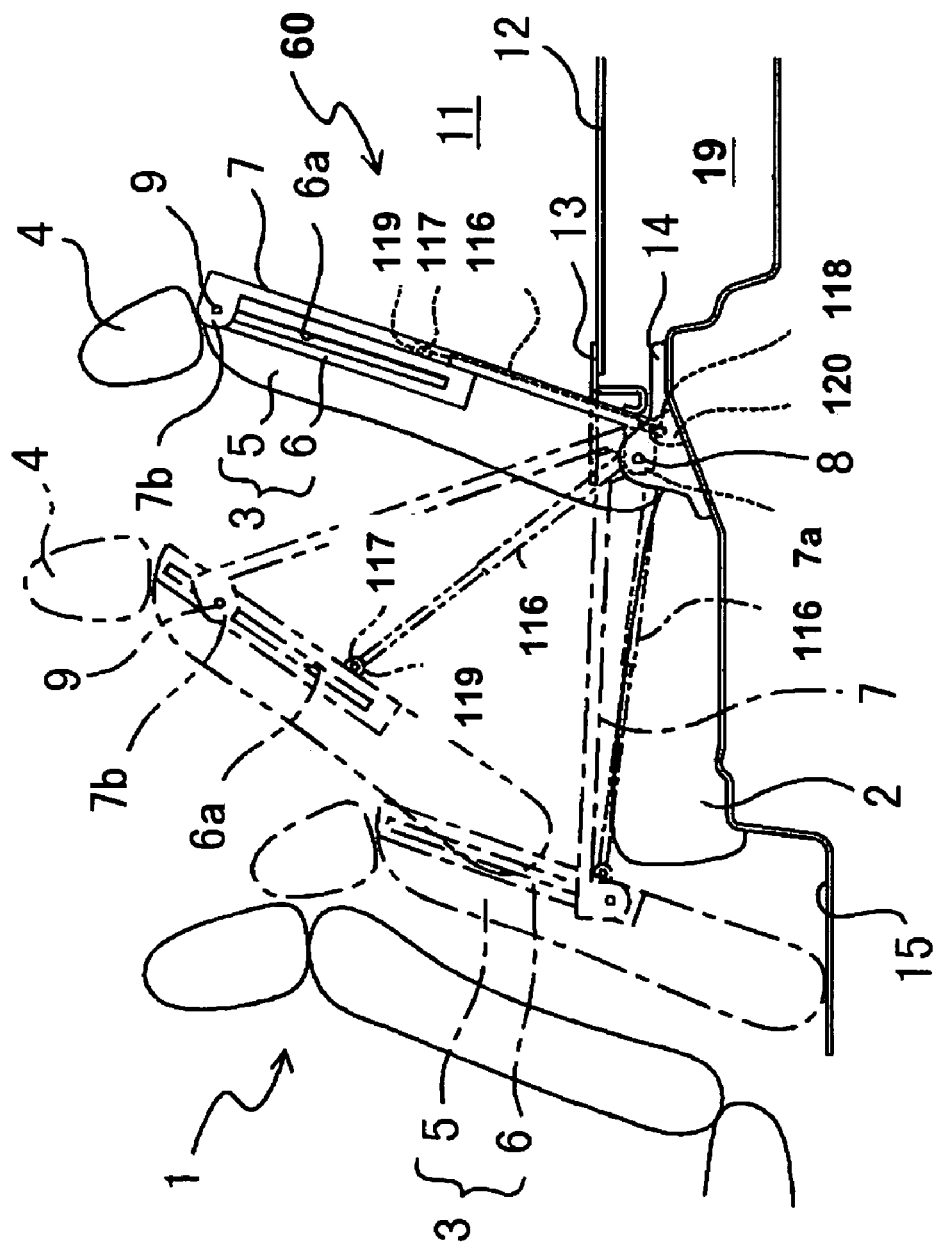
FIG. 18 is a side view showing schematically a movement mechanism of a rear seat according to a fifth embodiment of the present invention.
Figure 19:
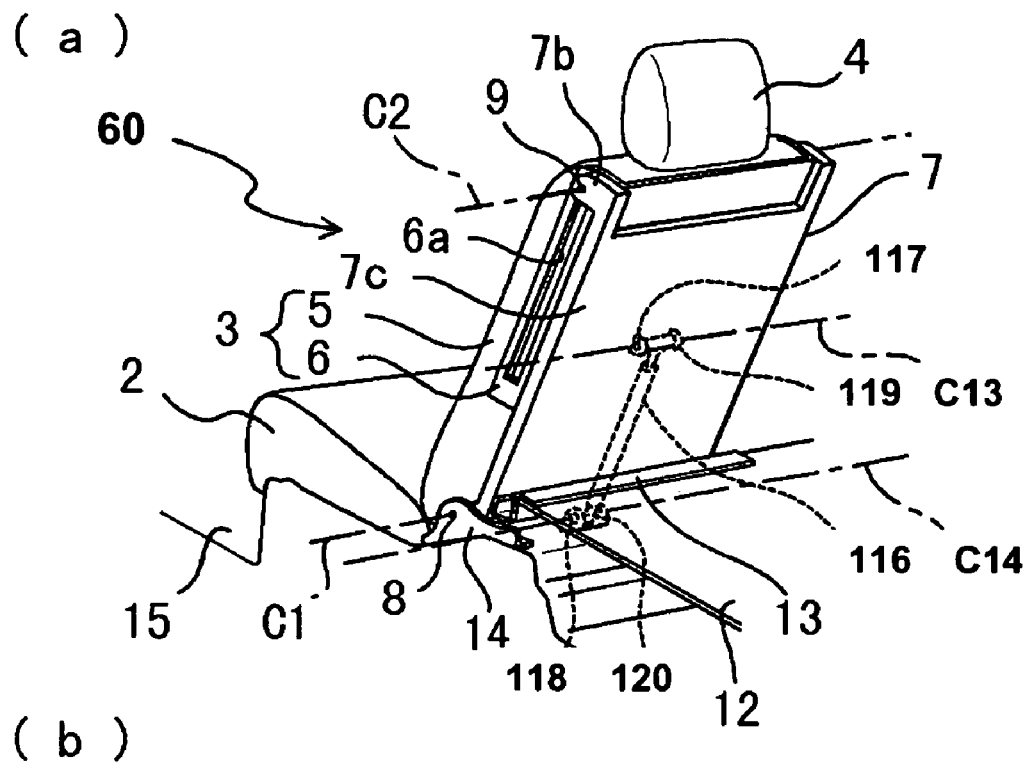
FIG. 19(a) is a perspective view of the rear seat of the vehicle in its use position according to the fifth embodiment, when viewed from the rear left side.
FIG. 19(b) is a perspective view of the rear seat of the vehicle in its rising position after its movement according to the fifth embodiment, when viewed from the rear left side.
Figure 19:
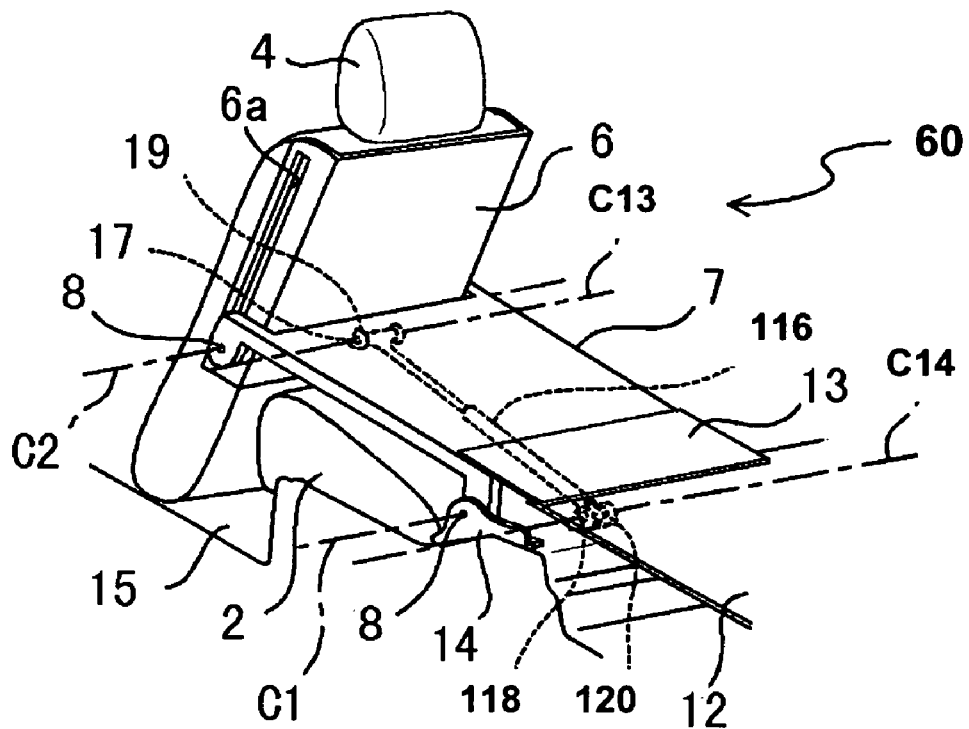

FIG. 18 is a side view showing schematically a movement mechanism of a rear seat 60 between its use position and its rising after its movement according to a fifth embodiment of the present invention. Respective states of the rear seat 60 taking its use position, its rising position after its movement, and its under-way position are illustrated respectively by a solid line, a one-dotted broken line, and a two-doted broken line. FIG. 19(*a*) and FIG. 19(*b*) are perspective views of the rear seat 60 located respectively in its use position and in its rising position after its movement according to the fifth embodiment, when viewed from the rear left side. In the fifth embodiment, there is provided a biasing member to be interposed between the seat back 3 and the cover member 7 so as to resiliently bias away each other.

Figure 20:
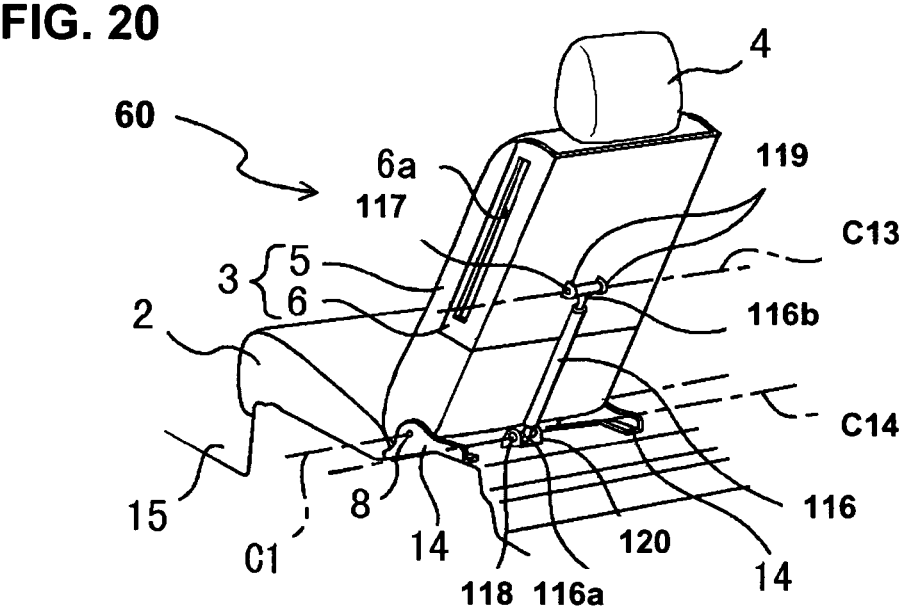
FIG. 20 is a view showing a structure without a seat back cover of FIG. 19(a).
Figure 21:
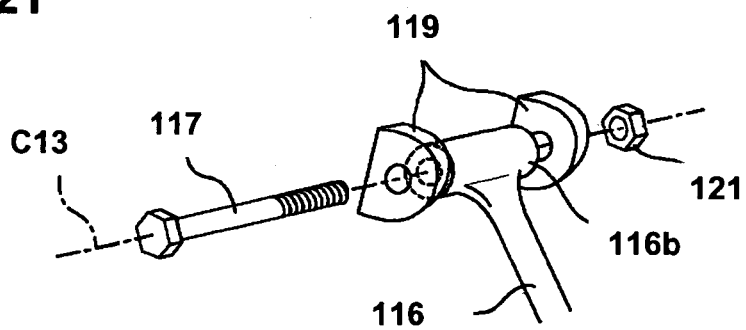
FIG. 21 is a view showing a connecting structure of an expanding member to a plate member according to the fifth embodiment.
Figure 22:
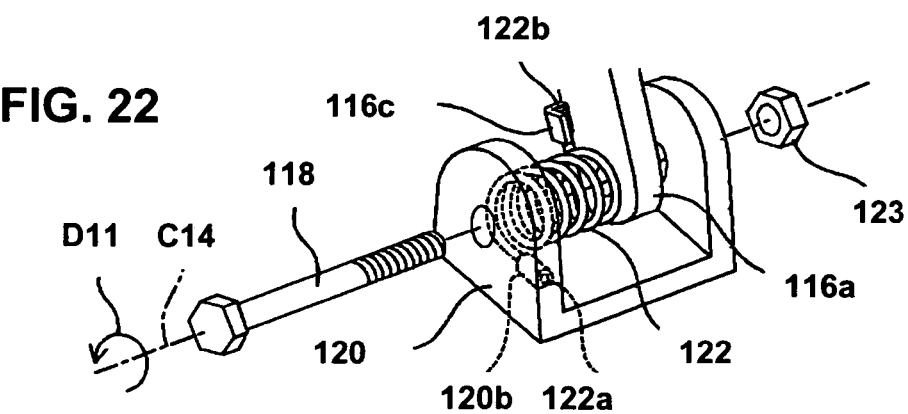
FIG. 22 is a view showing a connecting structure of the expanding member to an attachment member according to the fifth embodiment.

Hereinafter, the attachment structure of the biasing member to move the rear seat 60 will be described referring to FIGS. 20 through 22. FIG. 20 is a perspective view of the rear seat 60 shown in FIG. 19(*a*) without the seat back cover 7, the flexible member 13 attached to it, and floor board 12. FIG. 21 shows a detailed structure of upper end portion 116*b* of an expanding member 116 as the biasing member, which is attached to the back face of the seat back 3. FIG. 22 shows a detailed structure of a lower end portion 116a of the expanding member 116.

The expanding member 116 is pivotally connected to the back face of the seat back 3, specifically to an attachment member (bracket) 119 which is provided on a back face of the holding plate 6 at lower and center portion thereof, via a connecting member 117 at its upper end 116b, and it is rotatable around an axis C13 defined by the connecting member 117. Meanwhile, the expanding member 116 is pivotally connected to an attachment member (bracket) 120 which is provided at a center portion of the floor panel 15 near the rear end of the seat cushion 2 via a connecting member 118 at its lower end 116a, and it is rotatable around an axis C14 defined by the connecting member 118. The expanding member 116 is equipped with an expanding spring (not illustrated) therein which expands and contracts in its longitudinal direction, which is contracted, when the rear seat 60 is in its use position, so as to bias the upper end portion 116b upward.

As shown in FIG. 21, the upper end portion 116b of the expanding member 116 and the attachment member 119 provided on the back face of the holding plate 6 at lower and center portion have holes respectively for inserting the connecting member 117 therein. The expanding member 116 is attached to the attachment member 119 via the connecting member (bolt) 117 and a nut 121, thereby is connected to the holding plate 6. Accordingly, the expanding member 116 is rotatable around the axis C13 defined by the connecting member 117.

There is provided a torsion spring 122 operative to bias the upper end portion 116b of the expanding member 116 forward at the connecting portion of the expanding member 116 to the floor panel. As shown in FIG. 22, the torsion spring 122 is held by a spring holding portion 120b, which is provided at the attachment portion 120, at its one end 122a. While, the torsion spring 122 is engaged with an engagement piece 116c, which is formed at an edge portion of the lower end portion 116a of the expanding member 116 at its other end 122b. Accordingly, the torsion spring 122 provides a biasing force to the expanding member 116.

The lower end portion 116a of the expanding member 116 and the attachment member 120 have holes respectively for inserting the connecting member 118 therein. The expanding member 116 is attached to the attachment member 120 via the connecting member (bolt) 118 and a nut 123 in a state where the engagement piece 116c is engaged with the one end portion 122b of the torsion spring 122, thereby is connected to the floor panel 15. Accordingly, the expanding member 116 is rotatable and biased in an arrow D11 direction around the axis C14 defined by the connecting member 118.

Herein, although the single expanding member 116 is provided at the central portion of the back face of the seat back 3 in FIGS. 19 and 20, there may be provided plural expanding members.

Herein, the rear seat 60 in the fifth embodiment is also equipped with the latch mechanism (striker 31, latch 32 and operational lever 33) like the second embodiment shown in FIG. 10, which is provided between the holding plate 6 and the seat back cover 7 so as to provide the engagement therebetween.

According to the rear seat 60, the seat back cover 7 holds the seat back 3 so as to rise behind the seat back 3 along with the seat back 3 in the seat-use position, by engaging the striker 31 with the latch 32. While, the both engagement is released (unlatched) by the operational lever 33, and the seat back 3 is moved by the biasing forces of the expanding member 116 and the torsion spring 122 in such a manner that its lower end is pushed forward. Here, as apparent from FIG. 18, the seat back 3 is rotated forward while being supported by the seat back cover 7 and the expanding member 116, and accordingly, the slider 9 slides downward along the guide slit 6a. At the same time, the seat back cover 7 is rotated forward and covers the upper face of the seat cushion 2, so that it forms the substantially flat face by the back face of the flat portion 7c in cooperation with the floor board 12 constituting the floor face of the load compartment 11. While, the seat back 3 is moved in front of the seat cushion 2 and behind the front seat 1 so as to be located in its rising position.

According to the fifth embodiment described above, by a simple operation of releasing the latch 32 by just operating the operational lever 33, the seat back 3 is moved forward automatically by the expanding member 116 and the torsion spring 122, and the seat back cover 7 covers the upper face of the seat cushion to form the horizontal face. Herein, only the seat back cover 7 is located on the seat cushion 2 and the seat back 3 is located in front of the seat cushion 2 and behind the front seat 1 in its rising position. Thus, the substantially flat and horizontal face can be formed in cooperation with the floor board 12 constituting the floor face of the load compartment 11, at the lower level by the seat back cover 7 without moving the seat cushion 2. Accordingly, a wide load compartment which can place large or long loads and the like stably therein can be provided, and the dead space in front of the seat cushion 2 can be utilized effectively.

Further, since the seat back 3 and the floor panel 15 are interconnected by the expanding member 116, the seat back 3 is held by the both seat back cover 7 and the expanding member 116. Accordingly, the holding force of the seat back 3 can be further increased, compared to the seat back 3 held only by the seat back cover 7, thereby suppressing any improper movement of the seat back 3 and providing a stable, smooth and certain movement to the seat back 3.

Embodiment 6

Figure 23:
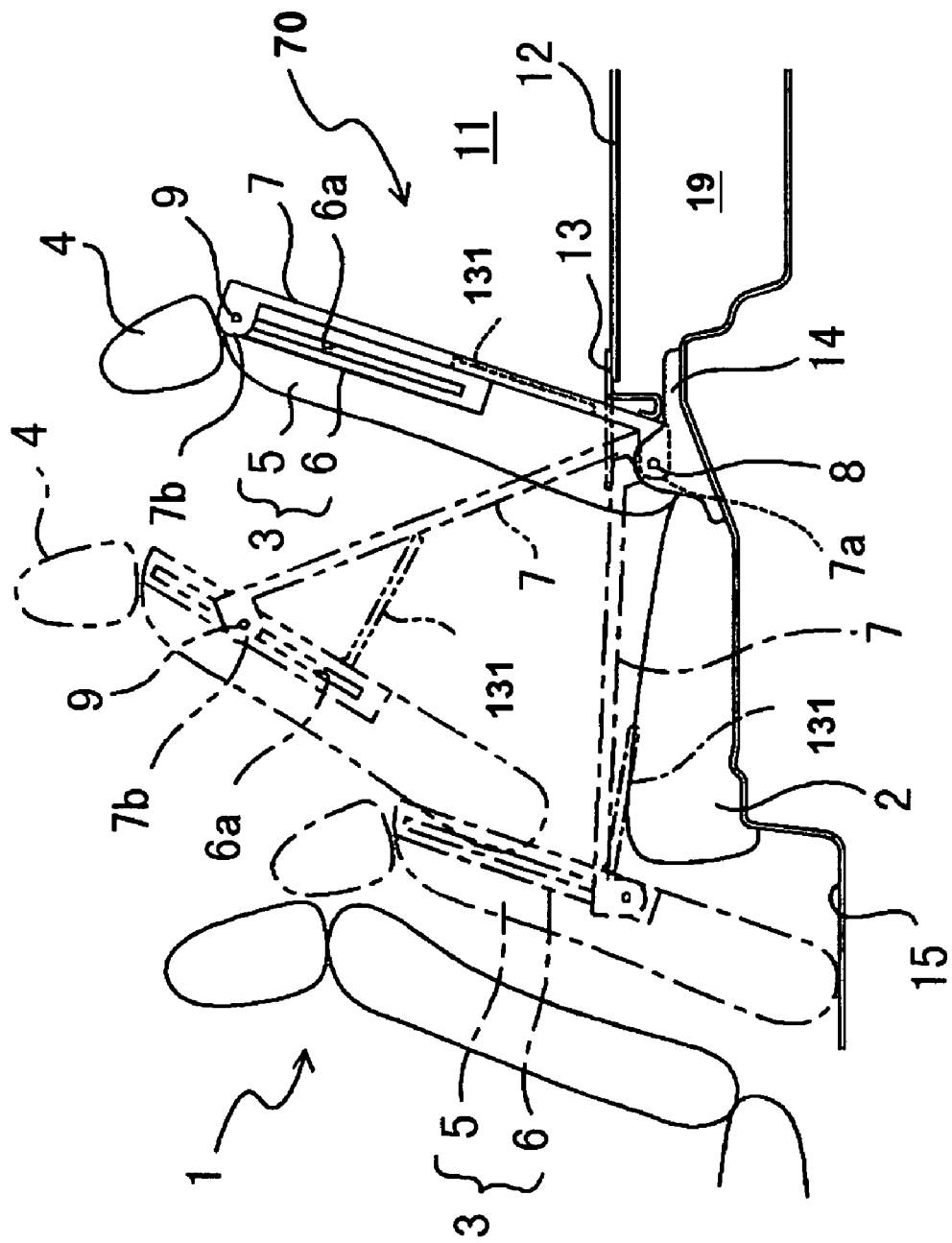
FIG. 23 is a side view showing schematically a movement mechanism of a rear seat according to a sixth embodiment of the present invention.
Figure 24:
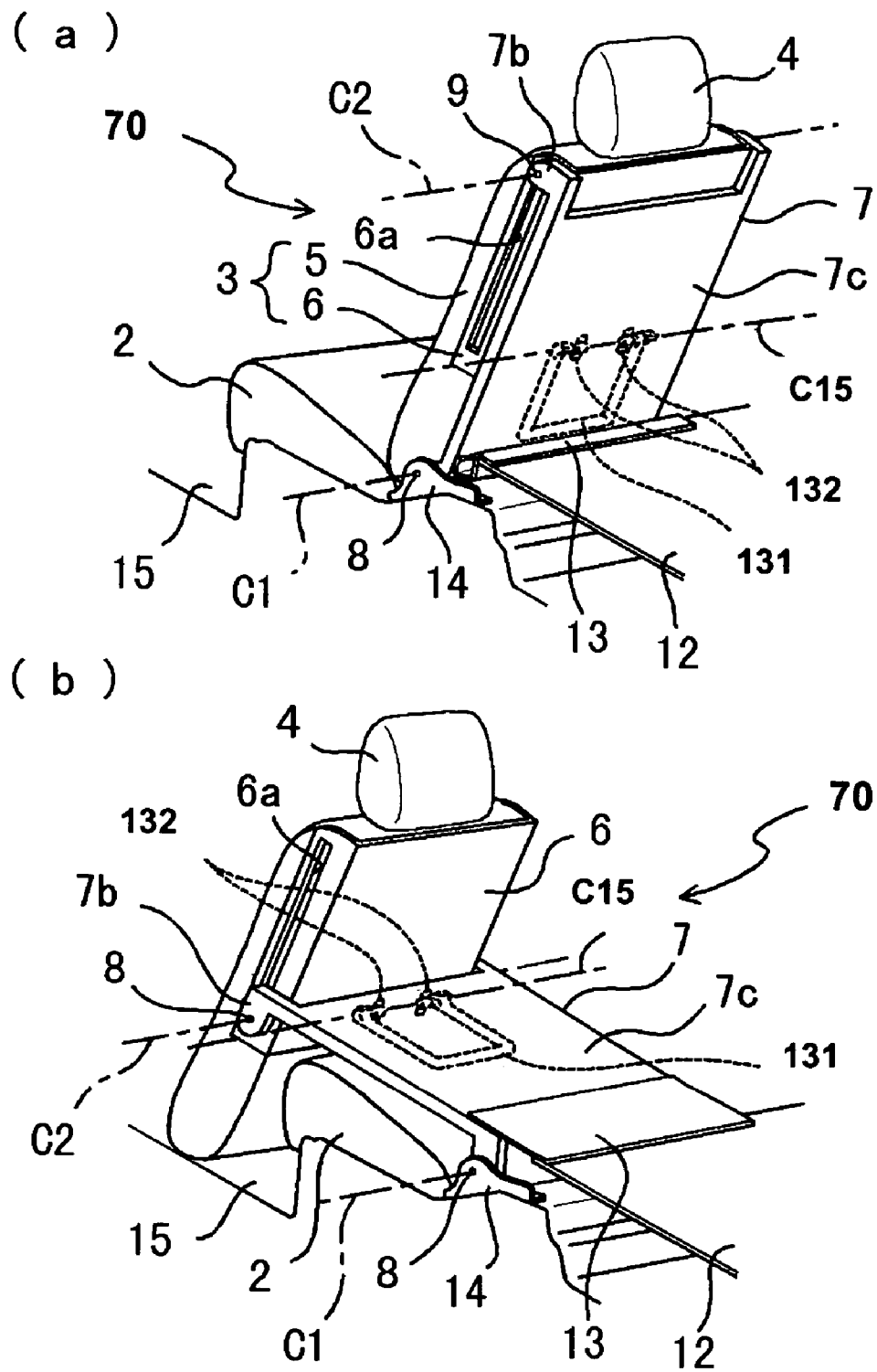
FIG. 24(a) is a perspective view of the rear seat of the vehicle in its use position according to the sixth embodiment, when viewed from the rear left side.
FIG. 24(b) is a perspective view of the rear seat of the vehicle in its rising position after its movement according to the sixth embodiment, when viewed from the rear left side.

FIG. 23 is a side view showing schematically a movement mechanism of a rear seat 70 according to a sixth embodiment of the present invention. Respective states of the rear seat 70 taking its use position, its rising position after its movement, and its under-way position are illustrated respectively by a solid line, a one-dotted broken line, and a two-doted broken line. FIG. 24(a) and FIG. 24(b) are perspective views of the rear seat 70 located respectively in its use position and in its rising position after its movement according to the sixth embodiment, when viewed from the rear left side. The sixth embodiment has the same basic structure as the fifth embodiment, but its biasing member to bias the seat back 3 is configured of a U-shaped frame 131 (corresponding to a biasing piece in claim), which is different from that.

Figure 25:
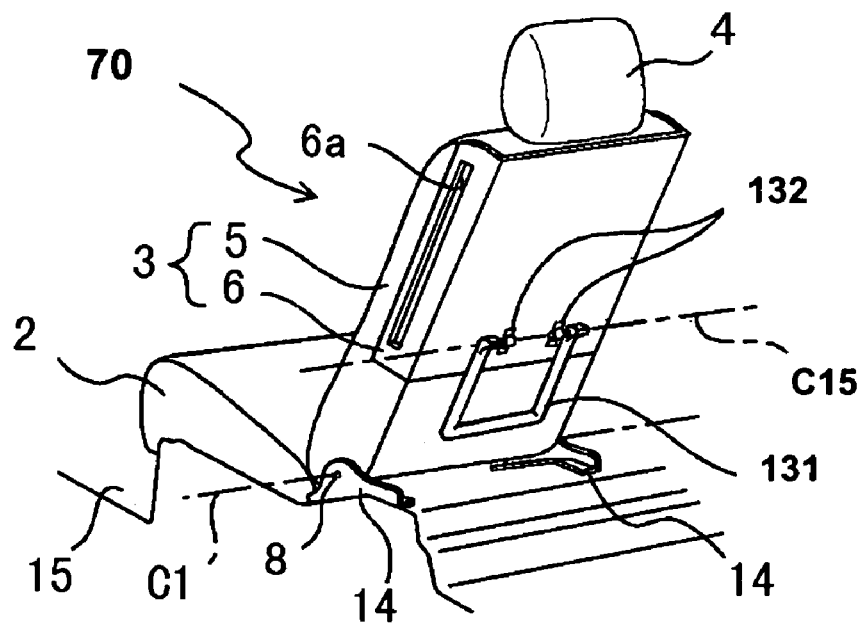
FIG. 25 is a view showing a structure without a seat back cover of FIG. 24(a).
Figure 26:
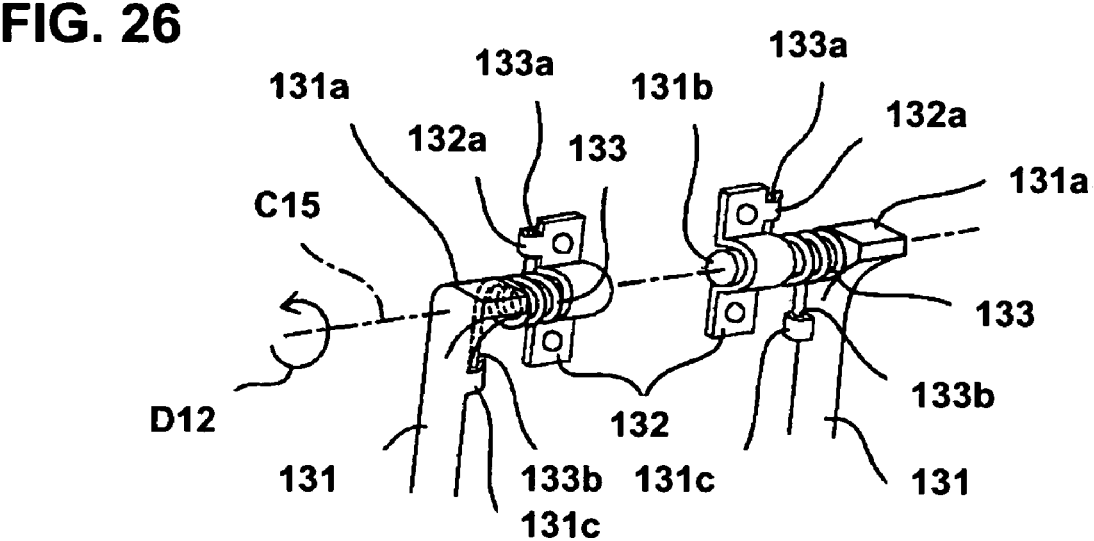
FIG. 26 is a view showing a connecting structure of a U-shaped frame to a plate member according to the sixth embodiment.

FIG. 25 is a perspective view of the rear seat 70 shown in FIG. 24(a) without the seat back cover 7, the flexible member 13 attached to it, and floor board 12. FIG. 26 is a view showing a detailed attachment structure of a U-shaped frame 131 as the biasing member, which is attached to the back face of the seat back 3. As shown in FIGS. 25 and 26, U-shaped frame 131 is a frame which is of a U shape. Its lower portion has a curved and closed end, while its upper portion has open ends which comprise stopper portions 131a and engagement portions 131b. The stopper portions 131a have flat faces which are substantially perpendicular to the back face of the holding plate 6, and the engagement portions 131b are configured so as to extend inward (toward the center of seat) and engage with attachment members (U-shaped brackets) 132 by being inserted therein. The attachment members 132 are attached to the back face of the seat back 3, specifically to the back face of the holding plate 6, at a lower and center portion thereof. The engagement portions 131b at the upper end of the U-shaped frame 131 are engaged with this attachment members 132. Accordingly, the U-shaped frame 131 is connected to holding plate 6 so as to be rotatable around an axis C15 defined by the engagement portions 131b.

Torsion springs 133 which bias the lower end (curved portion) of the U-shaped frame 131 reward and upward are installed at the connecting portions of the U-shaped frame 131 to the holding plate 6. The torsion springs 133 are attached in such a manner that the engagement portions 131b of the U-shaped frame 131 are inserted into their torsional centers. Their one ends 133a engage with the engagement pieces 132a which are provided at edge portions of the attachment members 132, while their other ends 133b engage with engagement pieces 131c formed at their inside ends near the upper end of the U-shaped frame 131. Accordingly, the U-shaped frame 131 is biased in an arrow D12 around the axis C15 defined by the engagement portions 131b with respect to the holding plate 6. Herein, the U-shaped frame 131 is allowed to rotate in the arrow D12 direction until the angle between the U-shaped frame 131 and the back face of the holding plate 6 becomes a substantially right angle, but its further rotation beyond the angle is limited by the stopper portions 131a provided at the upper end of the U-shaped frame 131.

According to the rear seat 70, the seat back cover 7 holds the seat back 3 so as to rise behind the seat back 3 along with the seat back 3 in the seat-use position, by engaging the striker 31 with the latch 32. While, the both engagement is released (unlatched) by the operational lever 33, and the seat back 3 is moved by the biasing forces of the U-shaped frame 131 in such a manner that its lower end is pushed forward. Here, as apparent from FIG. 23, the seat back 3 is rotated forward with being supported by the seat back cover 7 and the U-shaped frame 131, and accordingly, the slider 9 slides downward along the guide slit 6a. The U-shaped member 131 biases the seat back 3 forward and upward with respect to the seat back cover 7 by its lower end (curbed portion) pushing against and sliding upward over an inside face of the flat portion 7c of the seat back cover 7 which faces to the back face of the seat back 3. At the same time of the movement of the seat back 3, the seat back cover 7 is rotated forward and covers the upper face of the seat cushion 2, so that it forms the substantially flat face by the back face of the flat portion 7c in cooperation with the floor board 12 constituting the floor face of the load compartment 11. While, the seat back 3 is moved in front of the seat cushion 2 and behind the front seat 1 so as to be located in its rising position.

According to the sixth embodiment described above, by the simple operation of releasing the latch 32 by just operating the operational lever 33, the seat back 3 is moved forward automatically by the U-shaped frame 131, and the seat back cover 7 clovers the upper face of the seat cushion 2 to form the horizontal face. Herein, only the seat back cover 7 is located on the seat cushion 2 and the seat back 3 is located in front of the seat cushion 2 and behind the front seat 1 in its rising position. Thus, the substantially flat and horizontal face can be formed in cooperation with the floor board 12 constituting the floor face of the load compartment 11, at the lower level by the seat back cover 7 without moving the seat cushion 2. Accordingly, a wide load compartment which can place large or long loads and the like stably therein can be provided, and the dead space in front of the seat cushion 2 can be utilized effectively.

Further, the structure of automatically moving the seat back 3 stably and smoothly between its use position and its rising position after its movement can be materialized by a relatively simple constitution. Also, since the U-shaped frame 131 is configured such that only its upper end is connected to the back face of the seat back 3 and its lower end (curbed portion) slides upward over the face of the seat back cover 7 which faces to the back face of the seat back 3, it can be located along the seat back cover 7 when the movement of the seat back 3 is completed, thereby preventing it from interfering with the seat cushion 2.

Herein, the figures of the expanding member and the biasing piece should not limited to the embodiments described above. Any other figures may be adopted.

The present invention is not limited to the exemplified embodiments described above, and various improvements and modifications may be adopted within the scope of a sprit of the present invention.

What is claimed is:

1. A seat structure for a vehicle including a rear seat which is disposed in front of a load compartment at a vehicle rear, comprising:
 a seat cushion;
 a seat back;
 a cover member to be disposed at a back side of said seat back,
 wherein said seat cushion and said seat back are configured so as to be separate from each other, and said cover member is pivotally connected to a vehicle floor at the vicinity of a rear end of said seat cushion at a lower end thereof and to said seat back at an upper end thereof, around respective axes extending in a vehicle width direction,
 whereby said seat back can be supported by said cover member so as to move forward and be located in a rising position thereof in front of said seat cushion and behind a front seat located before said rear seat according to a forward rotation of said cover member via the lower end pivotal connection to the vehicle floor, and said cover member is configured so as to cover substantially an upper face of said seat cushion and provide a substantially flat and horizontal face at the vehicle rear in cooperation with a floor of the load compartment when said seat back has moved forward.

2. The seat structure for a vehicle of claim 1, further comprising a guide member which is provided at a side face of said seat back so as to extend in a longitudinal direction of the seat back, wherein the upper end of said cover member to be pivotally connected to said seat back is configured so as to slide along said guide member with respect to said seat back.

3. The seat structure for a vehicle of claim 2, further comprising a link member which is pivotally connected to said seat back at one end thereof and to said cover member at other end thereof, whereby said seat back is configured so as to be held in said rising position thereof by said link member interconnecting said seat back with said cover member.

4. The seat structure for a vehicle of claim 3, wherein said seat back comprises a cushion member and a holding member to be provided so as to hold said cushion member and include said guide member, and said cover member includes a support frame to support said seat back so as to hold a passenger sitting.

5. The seat structure for a vehicle of claim 2, further comprising a support member which is pivotally connected to the vehicle floor at one end thereof and to said seat back at other end thereof so as to support said seat back along with said cover member.

6. The seat structure for a vehicle of claim 5, further comprising a link member which is pivotally connected to said support member at one end thereof and to said cover member at other end thereof, whereby said seat back is configured so as to be held in said rising position thereof by said support member with said cover member.

7. The seat structure for a vehicle of claim 6, wherein said seat back comprises a cushion member and a holding member to be provided so as to hold said cushion member and include said guide member, and said cover member includes a support frame to support said seat back so as to hold a passenger sitting.

8. The seat structure for a vehicle of claim 2, further comprising a biasing member to be interposed between said seat back and said cover member so as to resiliently bias away each other, and a fixing member to releasably fix said seat back to a sitting position for the passenger, whereby when said fixing member is released, said seat back can be rotated by said biasing member around the pivotal axis at the upper end of said cover member and supported by said cover member and said biasing member so as to move forward and be located in said rising position thereof.

9. The seat structure for a vehicle of claim 2, further comprising a biasing member to be interposed between said seat back and said cover member so as to resiliently bias away each other, and a fixing member to releasably fix said seat back to a sitting position for the passenger,
    whereby when said fixing member is released, said seat back can be rotated by said biasing member around the pivotal axis at the upper end of said cover member and supported by said cover member and said biasing member so as to move forward and be located in said rising position thereof,
    wherein said biasing member is configured of an expanding member which is pivotally connected to a back face of said seat back at an upper end thereof and to said vehicle floor near the rear end of said seat cushion at a lower end thereof, around respective axes extending in the vehicle width direction, and biases said seat back forward and upward.

10. The seat structure for a vehicle of claim 9, wherein said seat back comprises a cushion member and a holding member to be provided so as to hold said cushion member and include said guide member, and said cover member includes a support frame to support said seat back so as to hold a passenger sitting.

11. The seat structure for a vehicle of claim 2, further comprising a biasing member to be interposed between said seat back and said cover member so as to resiliently bias away each other, and a fixing member to releasably fix said seat back to a sitting position for the passenger,
    whereby when said fixing member is released, said seat back can be rotated by said biasing member around the pivotal axis at the upper end of said cover member and supported by said cover member and said biasing member so as to move forward and be located in said rising position thereof,
    wherein said biasing member is configured of a biasing piece which is pivotally connected to a back face of said seat back at one end thereof around an axis extending in the vehicle width direction and pushes against a face of the cover member which faces to the back face of said seat back by the other end thereof with a sliding contact therewith so as to bias said seat back forward.

12. The seat structure for a vehicle of claim 11, wherein said biasing piece is configured of a U-shaped frame, an open-end portion of which is pivotally connected to the back face of said seat back and a closed-end portion of which pushes against and slides over the face of the cover member which faces to the back face of said seat back.

13. The seat structure for a vehicle of claim 12, wherein said seat back comprises a cushion member and a holding member to be provided so as to hold said cushion member and include said guide member, and said cover member includes a support frame to support said seat back so as to hold a passenger sitting.

\* \* \* \* \*